April 28, 1959     R. L. PALMER     2,884,189
READ-IN CIRCUIT
Filed Aug. 31, 1953     9 Sheets-Sheet 1
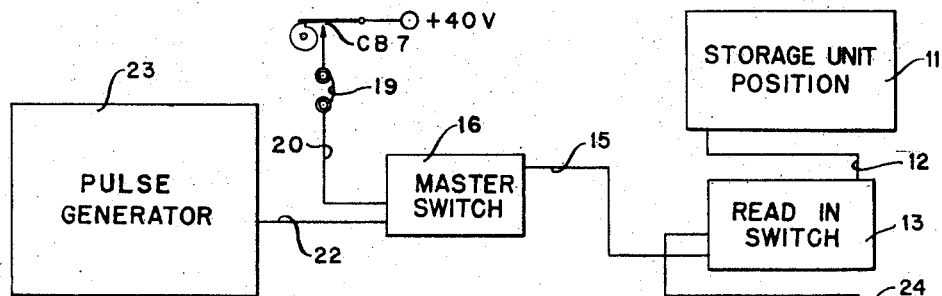
FIG. 1
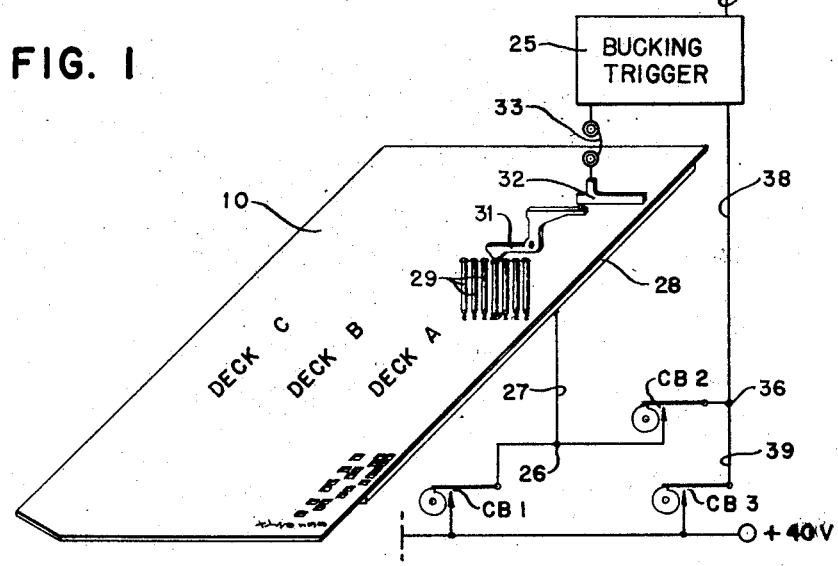
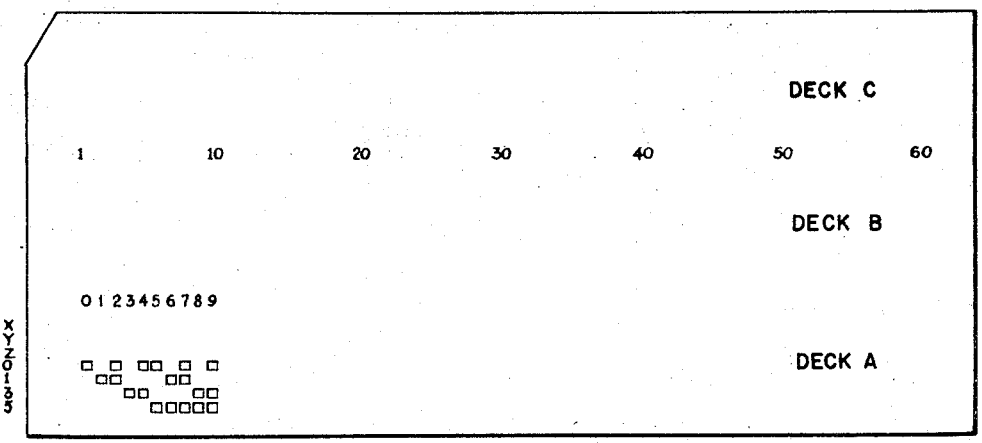
FIG. 2
INVENTOR
RALPH L. PALMER
BY
*Murray Naves*
ATTORNEY April 28, 1959.  R. L. PALMER  2,884,189
READ-IN CIRCUIT
Filed Aug. 31, 1953  9 Sheets-Sheet 2

FIG. 3

| | "X" | "5" | "3" | "1" | "0" | INDEX TIMES |

LEVER & PINS
CB 1
CB 2
CB 3
CB 7
FROM PULSE GENERATOR

FIG. 4

| | "5" | "3" | "1" | "0" | INDEX TIMES |
|---|---|---|---|---|---|
| 0 | | | | NO PULSE | |
| 1 | | | 1 | | |
| 2 | | | 1 | 1 | |
| 3 | | 2 | 1 | | |
| 4 | | 2 | 1 | 1 | |
| 5 | 5 | | | NO PULSE | |
| 6 | 5 | | 1 | | |
| 7 | 5 | | 1 | 1 | |
| 8 | 5 | 2 | 1 | | |
| 9 | 5 | 2 | 1 | 1 | |
| DIGITS | | | | | |

FIG. 6

| | "X" | "5" | "3" | "1" | "0" | INDEX TIMES |

LEVER & PINS
CB 1
CB 2
CB 3
CB 7
R 1
CB 6
CB 5
CB 8
CB 50
CB 51
CB 52
CB 53
NUMBER OF PULSES
FROM PULSE GEN.

INVENTOR
RALPH L. PALMER
BY
*Murray Nanes*
ATTORNEY

April 28, 1959

R. L. PALMER 2,884,189

READ-IN CIRCUIT

Filed Aug. 31, 1953

INVENTOR
RALPH L. PALMER

BY
Murray Nones
ATTORNEY

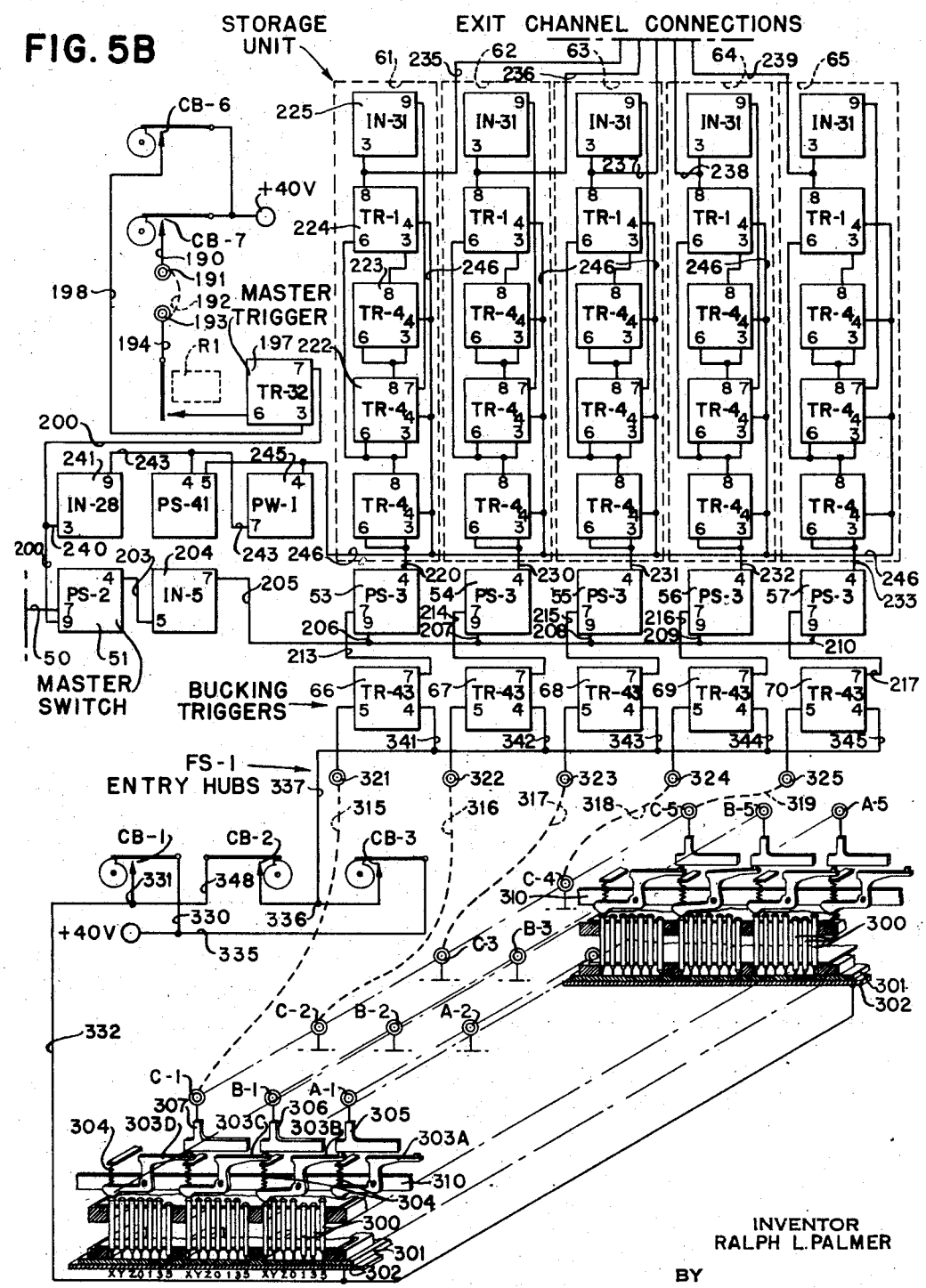

April 28, 1959  R. L. PALMER  2,884,189
READ-IN CIRCUIT
Filed Aug. 31, 1953  9 Sheets-Sheet 5
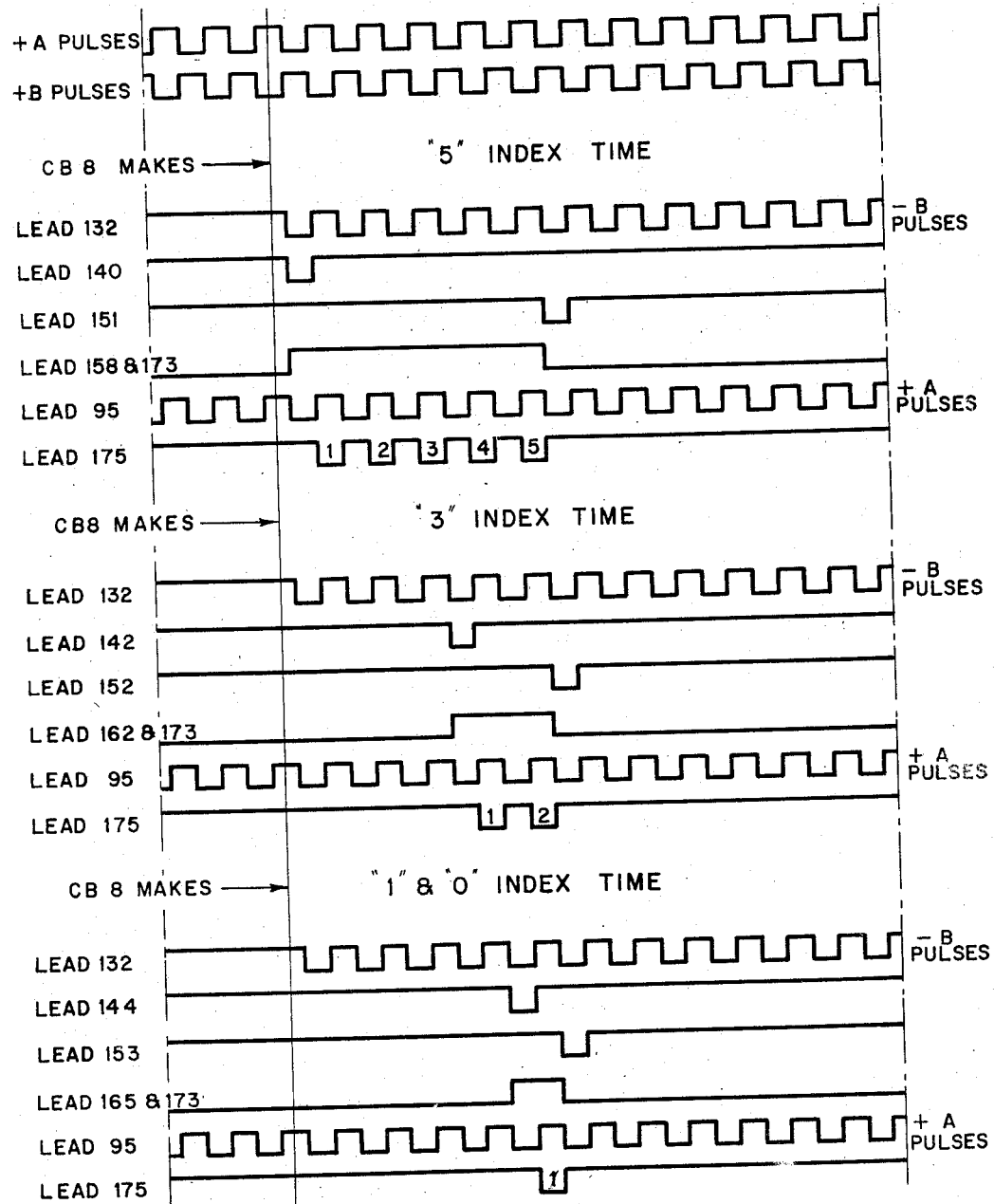
INVENTOR
RALPH L. PALMER
BY
Murray Nance
ATTORNEY April 28, 1959   R. L. PALMER   2,884,189
READ-IN CIRCUIT
Filed Aug. 31, 1953   9 Sheets-Sheet 6
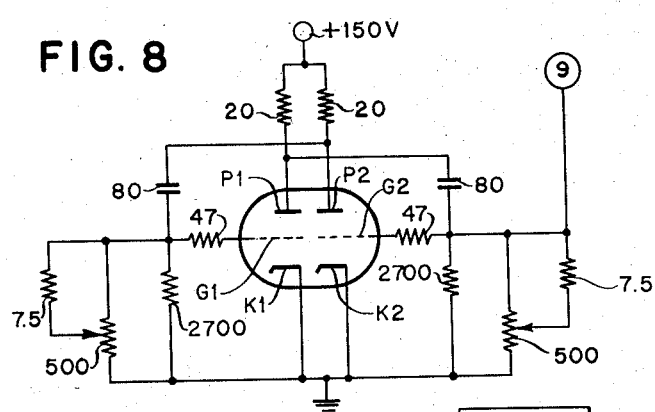
FIG. 8
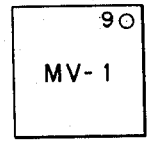
FIG. 9
FIG. 10
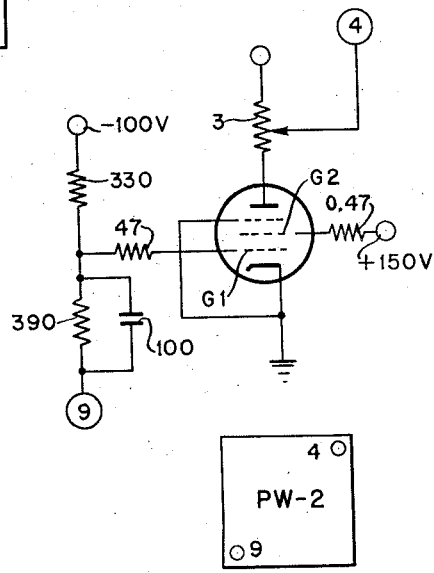
FIG. 11
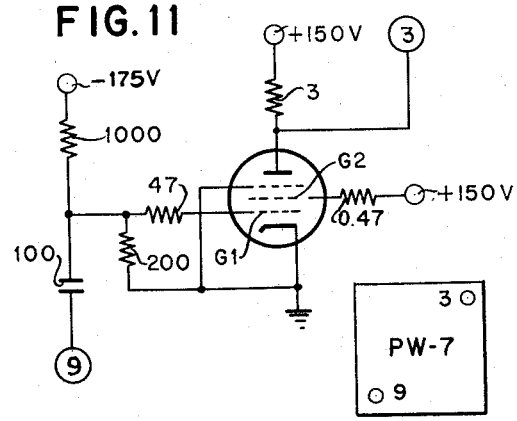
INVENTOR
RALPH L. PALMER
BY Murray Nones
ATTORNEY April 28, 1959     R. L. PALMER     2,884,189
READ-IN CIRCUIT Filed Aug. 31, 1953     9 Sheets-Sheet 7

INVENTOR
RALPH L. PALMER
BY Murray Nanes
ATTORNEY

INVENTOR
RALPH L. PALMER
BY Murray Nanes
ATTORNEY

April 28, 1959   R. L. PALMER   2,884,189
READ-IN CIRCUIT
Filed Aug. 31, 1953   9 Sheets-Sheet 9

INVENTOR
RALPH L. PALMER
BY Murray Nance
ATTORNEY

United States Patent Office 2,884,189
Patented Apr. 28, 1959

2,884,189

READ-IN CIRCUIT

Ralph L. Palmer, Poughkeepsie, N.Y., assignor to International Business Machines Corporation, New York, N.Y., a corporation of New York Application August 31, 1953, Serial No. 377,530

9 Claims. (Cl. 235—61.6)

This invention relates generally to improvements in record controlled accounting machines and calculators and more particularly to an advanced form of circuit for reading data at high speed from a perforated card into an electronic storage means.

In the record controlled accounting machine art, and especially in those machines which perform repetitive calculations, the digits which are the subject of each calculation are punched in individual cards, holes, in particular locations, indicating the digits. These digits are read from the card and held in storage units of the machine until they have served their purpose in the calculation. The results of the calculation may then be punched into the same card while the machine reads the digits, punched in the next card, into the storage units preparatory to the next calculation.

The storage units may be any form of electrical storage means capable of storing an indication of the number of pulses representative of the digits in the card.

The ordinary well-known type of record card has 80 columnar areas of twelve index point positions, in which each column can represent one digit, each card thus having a capacity for recording 80 digits. In some calculations, greater capacities are required and by arranging the card in multiple decks, each of which has 60 columnar areas of coded information representative of digits, the capacity of the card has been increased twofold.

The principal object of the invention, therefore, is to provide a novel high speed means for reading data from a perforated card into a storage unit.

Another object of the invention is to sense code perforations in a record card and initiate timed electronic impulses representative of data thereon and to feed these impulses at electronic speed to a storage unit where they can be stored for future use.

A further object is to provide an electronic read-in circuit which is capable of reading a multiple-deck card wherein numeric information is recorded in each deck by punched holes arranged according to a fixed code, a number of electronic pulses being produced indicative of the value of any hole sensed.

A still further object of the invention is to provide a read-in circuit which produces bursts of pulses, at electronic speeds, during the mechanical sensing of any code hole in a card, the number of pulses indicating the code hole value.

Yet another object of the invention is to provide an electronic read-in circuit which electronically produces pulses indicative of the value of any code hole sensed together with means for producing a total number of pulses indicative of the identity of a character represented by a plurality or by a single hole, dependent solely upon the idiosyncrasy of the code employed.

Other objects of the invention will be pointed out in the following description and claims and illustrated in the accompanying drawings, which disclose, by way of example, the principle of the invention and the best mode, which has been contemplated for applying that principle.

In the drawings:

Fig. 1 is a schematic flow diagram of the novel read-in circuit.

Fig. 2 is a detail view showing a sample three-deck card with the coded perforations labeled to identify digits.

Fig. 3 is a timing chart for the cam contacts shown in Fig. 1.

Fig. 4 is a chart showing the respective number of pulses entering the storage unit at different index times, for each digit.

Figure 5A:
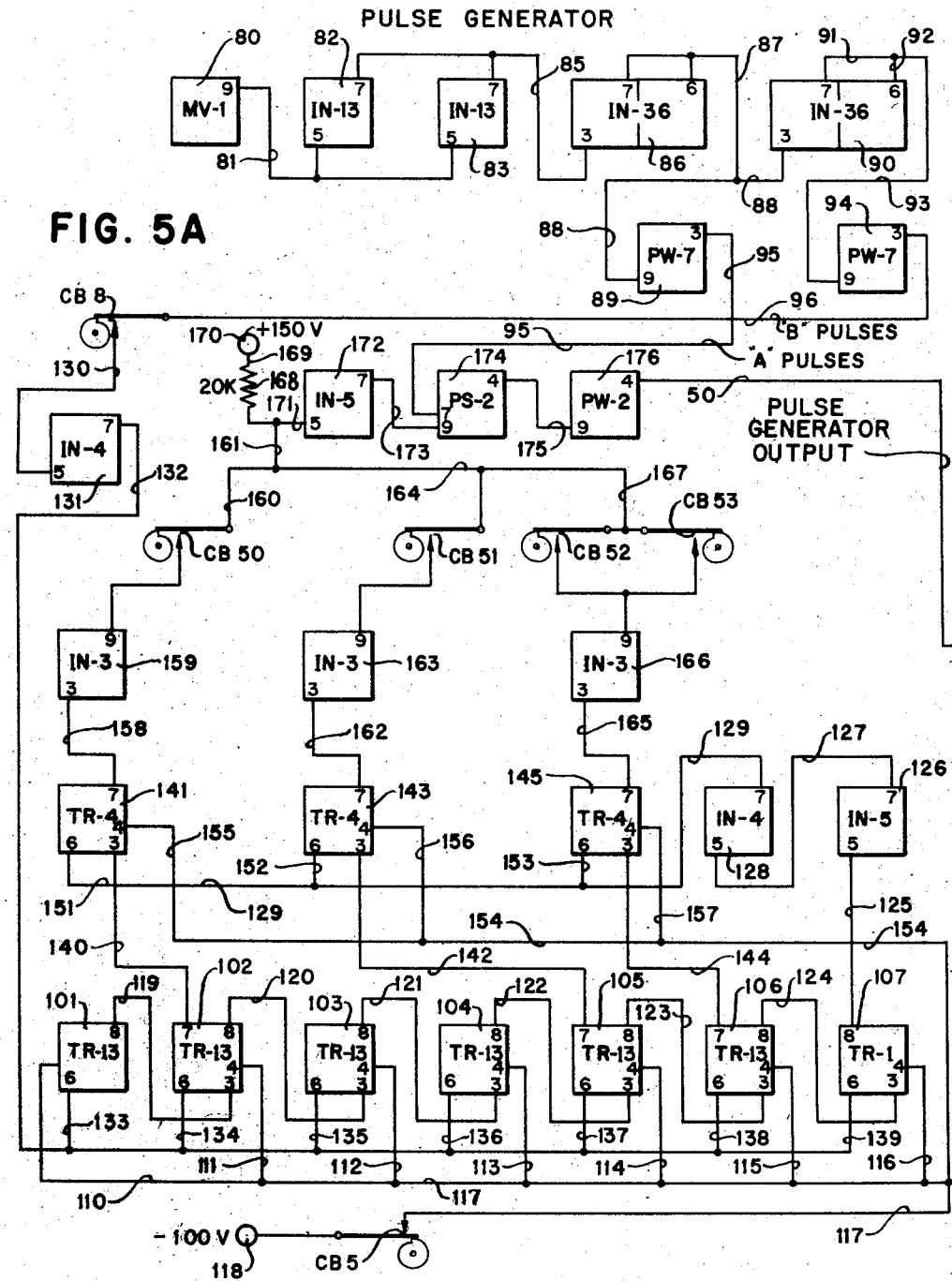
Figure 12:
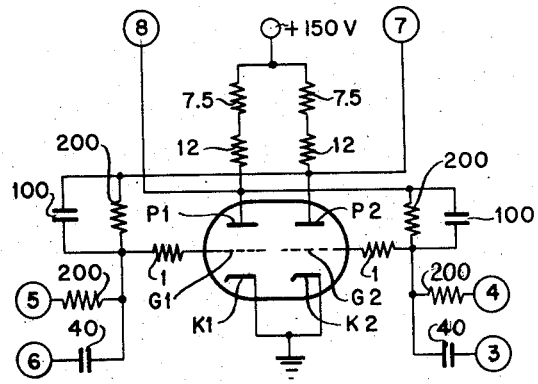

Figs. 5A and 5B taken together, with 5B to the right of 5A, comprise a complete wiring diagram of an embodiment of the preferred form of the invention.

Fig. 6 is a timing chart for the cam contacts, relay contacts, etc., shown in Figs. 5A and 5B.

Fig. 7 is a timing chart showing the relative timing of pulses developed in the pulse generator of Fig. 5A.

Fig. 8 is a detailed circuit diagram and its corresponding block symbol of a multivibrator employed in the invention.

Figs. 9, 10 and 11 are detailed circuit diagrams and the respective block symbols of different power tubes employed in the invention.

Figs. 12 to 16 are detailed circuit diagrams and the respective block symbols of different electronic triggers employed in the invention.

Figure 24:
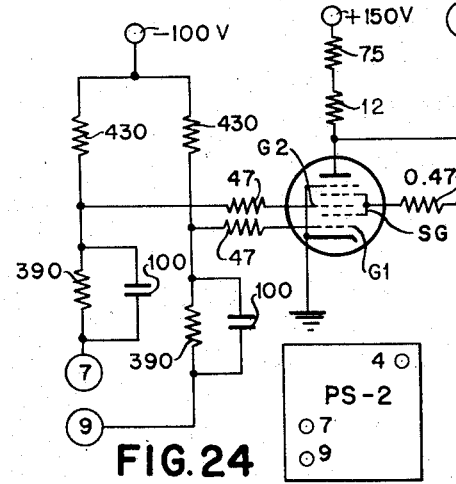
Figure 25:
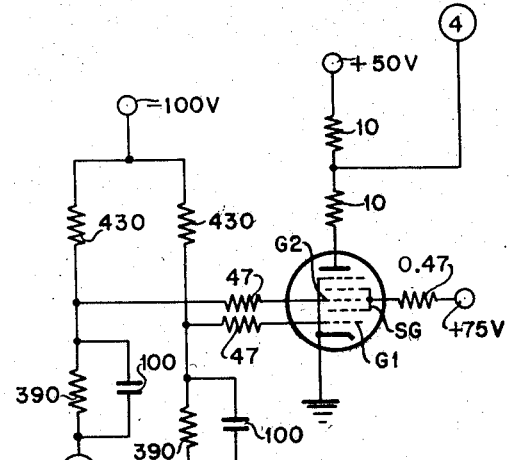
Figure 26:
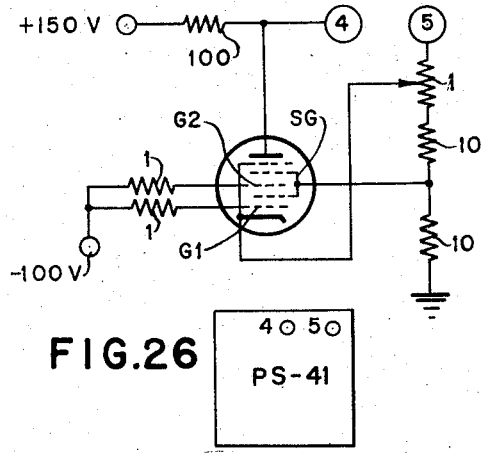

Figs 17 to 23 are detailed circuit diagrams and the respective block symbols of different inverter circuits employed in the invention, and Figs. 24 to 26 are detailed circuit diagrams and the respective block symbols of different pentagrid switches employed in the invention.

Wherever shown, unless otherwise indicated in the drawings, the values for the various resistors and condensers are in thousands of ohms and micro-microfarads, respectively. For example, a resistor labeled 200 indicates a 200K (200,000) ohm resistor; a condenser labeled 100 indicates a 100 micro-microfarad condenser.

The terms "positive" and "negative" potentials used in the description of the circuits refer to relative values rather than values with respect to ground.

Referring generally to Figs. 5A and 5B of the drawings, it will be seen that the different elements comprising the invention are represented by blocks, the contents thereof being illustrated in other figures of the drawings, the inputs and outputs only being indicated in Figs. 5A and 5B. Before proceeding with the description of the read-in circuit, a detailed description of the respective elements such as the multivibrator, power tubes, triggers, inverters, and pentagrid switches will be given. The contents of the respective blocks and the respective block symbols are shown in Figs. 8 to 26, inclusive.

*Multivibrator*

In Fig. 8, there is shown a type of multivibrator, whose block symbol is labeled MV–1. This multivibrator comprises, for example, a type 6J6 dual triode tube, the two triodes being contained in one envelope. Two such triodes with normally conducting grids, when retroactively capacitively coupled will oscillate, in a manner now well known in the art. This device is called a multivibrator and in the present invention is used as the parent source of square pulses supplied to the pulse generator of the read-in circuit.

Referring to Fig. 8, plate P1 of the left hand triode is coupled, via an 80 micro-microfarad condenser in series with a 47K ohm resistor, to a grid G1 of the right hand triode. Connected between ground and the junction of this resistor and condenser are a 500K ohm potentiometer in parallel with a 2700K ohm resistor. A 7.5K ohm resistor is connected between the same junction and a tap on the 500K ohm potentiometer. Plate P1 of the left hand triode is connected via a 20K ohm resistor to a +150 volt source, while P2 of the right hand triode is connected to the same +150 volt source through another 20K ohm resistor.

Cathodes K1 and K2 are commonly connected to ground. Plate P2 is coupled to the grid G2 by an 80 micro-microfarad condenser in series with a 47K ohm resistor. Connected between ground and the junction of this condenser and resistor are a 500K ohm potentiometer in parallel with a 2700K ohm resistor. A 7.5K ohm resistor is connected between this latter junction and a tap on the 500K ohm potentiometer. The frequency of the multivibrator can be set, by varying the taps on the two 500K ohm potentiometers and the square wave output is taken from output terminal "9", which is connected as shown.

Power tubes

Referring to Figs. 9, 10 and 11, power tube circuits are illustrated therein, designated as PW-1, PW-2 and PW-7, respectively. A power tube is one which is capable of producing a power gain from an input signal with, however, a voltage inversion. The circuits shown in Figs. 9 to 11 include a pentode, which may be of the 6AQ5 type.

The plate of power tube PW-1 (Fig. 9) is connected directly to an output terminal "4". The PW-1 does not have its own plate voltage and plate load resistor and, therefore, these are to be provided in some other part of a circuit for proper operation. The grid G2 is connected through a 3.3K ohm resistor to ground. The suppressor grid is directly connected to the cathode, which is connected to a −175 volts supply. The grid G1 is connected, via a 1K ohm resistor in series with a 270K ohm resistor, to a −250 volt supply. Grid G1 is coupled through the same 1K ohm resistor, in series with an 820K ohm resistor shunted by a 100 micro-microfarad condenser, to an input terminal "7".

Both power tubes PW-2, and PW-7 have grounded cathodes and suppressor grids which are directly connected to the cathodes. The grids G2 of PW-2 and PW-7 are connected respectively, through a 0.47K resistor, to a source of +150 volts. The plate is connected to a +150 volts power supply, through a 3K ohm resistor. Power tube PW-2 (Fig. 10) has an output terminal "4", connected to a tap on said 3K resistor. The grid G1 is connected, through a 47K resistor in series with a 330K resistor, to a −100 volt negative bias supply. Grid G1 is coupled through the same 47K resistor in series with a 390K ohm resistor, shunted by a 100 micro-microfarad condenser, to an input terminal "9".

Grid G1 of the power tube PW-7 (Fig. 11) is coupled through a 47K ohm resistor in series with a 100 micro-microfarad condenser, to an input terminal "9". Grid G1 receives its negative bias through the same 47K resistor connected to a divider network comprising a 200K resistor connected to ground, as shown, and a 1000K resistor, connected to a source of −175 volts. An output terminal "3" is connected to the plate.

Triggers

Referring to Figs. 12 to 16, inclusive, the details of several electronic triggers are shown, designated respectively TR-1, TR-4, TR-13, TR-32 and TR-43, which are commonly known in the art as the Eccles-Jordan type trigger. These each comprise two cross-coupled triodes (which may be included in one envelope, such as, for example, a type 6J6 tube) in which a plate P1, of the left hand triode, is coupled, by means of a 200K ohm resistor in series with a 1K ohm resistor, to the grid G2 of the right hand triode and, plate P2 of the right hand triode is, likewise coupled to the grid G1 of the left hand triode. In all of the triggers, except TR-43, each of these 200K resistors is shunted, by a 100 micro-microfarad condenser, as shown. Plates P1 and P2 of all the triggers are similarly connected to a +150 volt power supply, via pairs of 12K and 7.5K ohm resistors, in series, as shown.

In triggers TR-1, TR-4 and TR-13 (Figs 12, 13 and 14) respectively, grid G1 is connected, via the 1K ohm resistor in series with another 200K ohm resistor to a terminal "5", and, is coupled through the same 1K ohm resistor in series with a 40 micro-microfarad condenser, to an input terminal "6". Grid G2 is connected by identical circuitry to a terminal "4" and to an input terminal "3". The cathodes K1 and K2 of triggers TR-1, TR-4 and TR-13 are grounded, as shown.

Triggers TR-1, TR-4 and TR-13 differ from each other only in the specific connections of their output terminals. In trigger TR-1 (Fig. 12) an output terminal "8" is directly connected to plate P1 and an output terminal "7" is directly connected to plate P2, as shown.

In trigger TR-4 (Fig. 13) a terminal "7" is directly connected to plate P2, while a terminal "8" is connected, to the tap between the 7.5K ohm resistor and the 12K ohm resistor of plate P2.

In trigger TR-13 (Fig. 14), a terminal "7" is connected, to the tap between the 7.5K ohm resistor and the 12K ohm resistor of plate P1, while a terminal "8" is connected to the tap between the 7.5K and the 12K ohm resistors of plate P2.

Trigger TR-32 (Fig. 15) is similar to TR-1 except for details which will now be pointed out. The input terminal "6" of TR-32 is connected via an 82K ohm resistor to one side of the 1K ohm resistor whose other side is connected to grid G1. A 40 micro-microfarad condenser is connected, from the junction of the 1K and 82K ohm resistors to ground. Input terminal "3" is connected by identical connections to the grid G2. The only other difference between triggers TR-32 and TR-1 is that TR-32 has a 10 micro-microfarad condenser connected between the input circuits, as shown, in order to obtain more stabilized operation, the condenser tending to prevent operation by transient pulses.

Trigger TR-43 (Fig. 16) which is known as a "bucking" trigger, has one 5000 micro-microfarad condenser, connected from its plate P1 to the 1K ohm resistor which is connected to grid G1 and another 5000 micro-microfarad condenser, connected from plate P2 to the 1K ohm resistor which is connected to grid G2. An output terminal "7" is directly connected to P2. Trigger TR-43 also has its grid G1 connected via the 1K ohm resistor and a 200K ohm resistor to −100 volts and its grid G2 connected via the 1K ohm resistor and another 200K ohm resistor to −100 volts. Grid G1 of TR-43 is also connected, via the 1K ohm resistor and a 100K ohm resistor, to an input terminal "5." Terminal "5" is also connected via a 5.1K ohm resistor to ground. The connections to an input terminal "4" on the right hand side of trigger TR-43 is identical to the connections for input terminal "5." The cathodes K1 and K2 of TR-43 are commonly connected through a 19.7K ohm resistor to −100 volts.

As is now well-known in the art, the triggers described have two conditions of stability. When the left hand triode of the trigger is conducting, the voltage at plate P1, with the circuit values indicated, is lowered from approximately +140 volts to approximately +40 volts, which through the coupling previously described, maintains the grids G2 relatively negative, so that the right hand triode is blocked when the left hand triode conducts. Thus, if the left hand triode is conducting, then plate P1 and its corresponding output are negative and plate P2 and its corresponding output are positive. This comprises one state of stability of the trigger and will hereinafter be designated as the On condition. In a similar manner, if the right hand triode is conducting, the reduction in voltage on plate P2 is applied by the coupling connection, previously described, to the grid G1, to thus block the left hand triode so that P1 and its corresponding left hand output now becomes positive and this condition will hereinafter be designated as the Off condition.

If, for example, the right hand triode is conducting, (trigger Off) a negative voltage applied to its grid G2 via input terminal "3," for example, will flip the trigger On by blocking the right hand triode and thus rendering the left hand side conductive. Likewise, if the left hand triode is conducting (trigger On), a negative voltage applied to its grid G1 via input terminal "6," for example, blocks the left hand side of the tube, thus flipping the trigger Off. The above two methods are normally used for flipping the triggers On and Off.

In the operation of the invention, it is required that some of the triggers be reset On and others reset Off before the start of an operation. To reset a trigger On, a sufficient positive voltage is applied to grid G1 to cause the left hand side of a 6J6 tube to conduct. The triggers TR-1, TR-4 and TR-13 are so designed, that a positive shift, applied to either input terminal "6" or to terminal "3" and through the 40 micro-microfarad condenser to the grid will not flip the triggers. However, by applying a positive voltage conductively, through terminal "5" or "4," of any of the triggers shown and through the corresponding resistors to one of the grids, the trigger will be flipped. In triggers which are to be reset On, terminal "4" is connected to a —100 volt negative bias supply and terminal "5" is connected to a —100 volt reset line, which is then shifted from —100 volts to ground potential (relatively plus), when it is desired to reset the trigger, ground potential being sufficiently positive to thus reset the trigger On by rendering the left hand triode conducting.

In triggers which are to be reset Off, it is the terminal "4" which is connected to the —100 volt reset line while terminal "5" is connected to the —100 volt negative bias supply so that when the —100 volt reset line 10 is shifted to ground potential, the right hand triode is rendered conducting, thus resetting the trigger Off.

Trigger TR-32 is a trigger specially designed to operate by means of positive cam pulses and, thus, if a positive pulse is applied to terminal "6," trigger TR-32 will turn On, and, likewise, if a positive pulse is applied to terminal "3," trigger TR-32 will turn Off.

Trigger TR-43 is a "bucking" trigger circuit having two stable conditions alternately assumed, wherein, a pulse applied to one grid only of the trigger, will effect the switching of the trigger to one stable condition, a pulse applied to the other grid will effect a switching of the trigger to the other stable condition, while pulses, applied simultaneously to both grids, do not effect the stable condition of the trigger. This "bucking" trigger principle is described and claimed in Patent 2,524,134 issued to Ralph L. Palmer, October 3, 1950.

Inverters

Inverter circuits, designated IN-3, IN-4, IN-5, IN-13, IN-28, IN-31 and IN-36, respectively, are illustrated in Figs. 17 through 23, respectively. The function of an inverter is to take a positive voltage supplied to its input terminal and produce a negative voltage at its output terminal. Conversely, negative inputs produce positive outputs.

Each inverter employed may comprise, for example, one-half of a dual triode type 6J6 tube, except that the inverter IN-36 (Fig. 23) employs both halves of the dual triode illustrated. Cathodes of all the inverters are connected to ground, as shown, except inverter IN-28 (Fig. 21) whose cathode is connected to a —175 volt supply.

In inverters IN-3, IN-4 and IN-5 (Figs. 17, 18 and 19, respectively), the grid is connected via a 47K ohm resistor and a 430K ohm resistor, to a source of —100 volts. The grid is coupled to an input terminal "5," through the same 47K ohm resistor, in series with a 390K ohm resistor shunted by a 100 micro-microfarad condenser, as shown. The plates of IN-4 and IN-5 are connected to a +150 volt power supply through 12K and 7.5K ohm resistors, in series. The plate of inverter IN-3 does not have either its own plate load resistor or its own plate voltage supply, but requires that these be provided in some other part of a circuit for proper operation. IN-4 differs from IN-5, only in that an output terminal "7" of IN-4 is connected, to the junction, of the 7.5K and the 12K ohm resistors, while inverter IN-5 has its output terminal "7" connected, directly to the plate.

Inverter IN-13 (Fig. 20) is similar to the inverter IN-5, except that its input terminal "5" is connected, directly to the control grid through a 47K ohm resistor, and no negative bias supply is provided.

Inverter IN-28 (Fig. 21) has an input terminal "3" which is coupled to the grid of the triode through a 1,000 micro-microfarad condenser and a 100K ohm resistor, in series. A —250 volt source is applied, to one end of a 330K ohm resistor, which in turn is connected via another 330K ohm resistor to —175 volts. The junction of the two 330K ohm resistors is connected, via the above mentioned 100K ohm resistor, to the grid of the triode. The plate of IN-28 is connected directly to an output terminal "9."

Inverter IN-31 (Fig. 22) has an input terminal "3" which is coupled to the grid of the triode through a 25 micro-microfarad condenser and a 1K ohm resistor. A —100 volt source is applied to one end of a 510K ohm resistor, connected, at its other end, to another 39K ohm resistor which in turn is connected to ground. The junction of the 510 ohm resistor and the 39K ohm resistor is connected, via the above mentioned 1K ohm resistor, to the grid of the triode. The plate of IN-31 is connected directly to an output terminal "9."

In inverter IN-36 (Fig. 23), a —100 volt source is applied to one end, of a 430K ohm resistor, whose other end is connected, via a 390K ohm resistor shunted by a 100 micro-microfarad condenser, to a terminal "3." The junction of the 430K ohm resistor and the 390K ohm resistor is connected, via one 47K ohm resistor, to the grid G1, and via another one 47K ohm resistor, to the grid G2. Plate P1 of the left hand triode is connected directly to an output terminal "7" and is also connected via a 12K ohm and a 7.5K ohm resistor, in series, to a +150 volt supply, while plate P2 of the right hand triode is connected directly to an output terminal "6" and is also connected, via a 12K ohm and a 7.5K ohm resistor, in series, to the +150 volt supply.

Pentagrid switches

Figs. 24 through 26, respectively, illustrate different pentagrid switches and their respective blocks PS-2, PS-3 and PS-41. Each pentagrid switch may employ a pentagrid tube of the 6BE6 type.

Switching circuits which are, in fact, gating means, require simultaneously applied positive voltages, at the respective input terminals, connected to their grids G1 and G2, in order to cause conduction of the respective tube, so that a negative output is produced, when and only when both inputs are positive. When a positive voltage is applied to one only, of the grids of a pentagrid switch, this voltage is said to condition the switch (or that grid). Thus, the switch (or the grid) has been conditioned, to permit conduction, when the other grid goes positive. If a grid of a switch is conditioned and positive pulses are applied to the other grid, the pulses will pass through the switch and are transformed to a like number of negative pulses.

The grid G1 of pentagrid switch PS-2 (Fig. 24) is shown as connected, by means of a 47K ohm resistor in series with a 430K ohm resistor, to a voltage source of —100 volts, and is also coupled, through the same 47K ohm resistor in series with a 390K ohm resistor shunted by a 100 micro-microfarad condenser, to an input terminal "9." Grid G2 is connected through a 47K ohm resistor in series with another 430K ohm resistor to said source of −100 volts and is also coupled through the same 47K ohm resistor in series with another 390K ohm resistor shunted by a 100 micro-microfarad condenser, to an input terminal "7." The plate of switch PS–2 is connected through 12K and 7.5K ohm resistors, in series, to a +150 volt supply. An output terminal "4" is connected directly to the plate. The cathode of switch PS–2 is grounded, as shown, and the suppressor grid is directly connected to the cathode. The screen grid SG is connected, via a 0.47K ohm resistor, to a source of +75 volts.

Switch PS–3 (Fig. 25) is exactly like switch PS–2 except that it has two 10K ohm resistors, in series, connecting its plate to the +150 volt supply and its output terminal "4" is connected to the junction of these two 10K ohm resistors.

PS–41 (Fig. 26) is not a pentagrid switch, in the true sense of the word, but acts as a pentagrid tube type voltage regulator. This is true, because varying voltages are not applied independently, to the two input grids but rather the two grids are tied together and connected to a −100 volt supply.

PS–41 is used as a voltage regulator in conjunction with the power tube PW–1 to form a circuit for supplying exactly −100 volts to a reset line in a manner referred to later. PS–41 has its plate connected to a +150 volt supply through a 100K ohm resistor, its cathode connected to the variable arm of a 1K ohm potentiometer which is part of a bleeder resistor circuit from a terminal "5" via this 1K ohm potentiometer and two 10K ohm resistors, in series, to ground. The screen grid SG is connected between the two 10K ohm resistors, and a terminal "4" is connected directly to the plate. Grid G1 is connected via a 1K ohm resistor to a fixed −100 volt supply while grid G2 is connected via another 1K ohm resistor to this −100 volt supply.

While specific tube types of tubes and values of resistors and condensers have been defined in connection with the multivibrator, power tubes, triggers, inverters and switches, these are to be taken as exemplary only and the tube type and values may be varied, in accordance with the knowledge of those skilled in the art, without departing from the spirit of the invention.

The three deck card

Fig. 2 shows a card used with the present read-in circuit and it is noted that the card is of standard Hollerith proportions and size, but the arrangement of index points or perforation positions thereon differ in that they appear in three decks A, B and C punched in a 7 position code which can represent digits, special signs and alphabet characters. For the purpose of this invention, only digits will be considered, which employ four of the seven positions of the code, as shown. Each deck comprises 60 vertical columns of index point positions; each column containing 7 positions. The columns of the three decks are in alignment so that, considering the card as a whole, there are 21 perforation positions in each vertical column and 60 perforation positions in each of the 21 horizontal row positions. Therefore, the card has 21 times 60 or 1260 possible perforation positions.

Deck A is illustrated in Fig. 2 as perforated with a sample set of perforations representative of all the digits. Digits represented are noted directly above deck A in alignment with the perforations representing each digit. To the left of the sample set of perforations and in alignment with the seven rows, are the 7 code designations "X," "Y," "Z," "0," "1," "3," "5" in their order of appearance, from top to bottom.

The hole X is used to represent signs and other controls, while the bottom four of the holes represent index positions "5," "3," "1" and "0," with "0" at times representing a one. For example, it is to be noted in Fig. 2, that a digit four is represented in this code by a "3" and a "0" perforation because at the time, the "0" is effective to add a one. There is a somewhat similar departure from the expected arrangement in the case of digits 2, 7 and 9, wherein the "0" in code assumes the value of a one. From a study of Fig. 2, two special features of this code can be observed which are used to advantage in the invention. The first feature is that a "0" has the value of one, only when punched in combination with a "3" or "1"; at all other times, it has the value of zero. The second feature is that none of the digits are made up of both a "3" and a "1." Since the values are dependent on the timing of electrical impulses from the sensing devices cooperating with the perforations, these differences in value are best explained hereinafter in connection with the generation of said impulses.

Flow diagram of read-in circuit

Before describing in detail the operation of the novel read-in circuit, per se, it is believed that a description of the flow diagram of Fig. 1, which condenses the entire read-in circuit into major blocks, will highlight the operation and permit a better understanding of the invention. Several of the types of elements illustrated in Fig. 1 were described in detail above, such as the bucking trigger and switches, while others will be described in detail later.

A card 10 (Fig. 1) may be provided with holes representative of a digit to be used in a calculation, but it has been found to be more convenient to take the digit from the card and store it in some sort of storage means from which it can be used more freely during calculations. A digit can be stored either mechanically or electrically in well-known types of storage means, but an electronic storage unit 11 has been shown, for example. Entering a digit into an electronic storage unit in the device of the invention consists of introducing pulses at its input equal in number to the value of the digit to be entered. This is accomplished by the circuit of Fig. 1.

The storage unit 11 receives pulses via a lead 12 from a read-in switch 13 of a type which requires two simultaneous inputs, to produce an output. One input of the read-in switch 13 is fed pulses via lead 15 from a master switch or gate 16. Master switch 16, which also requires simultaneous inputs, to produce an output, is conditioned by a +40 volts supply via a cam contact CB7, a read-in control plug wire 19, and a lead 20. The other input of master switch 16 is fed pulses via a lead 22 from a pulse generator 23.

The second input, for conditioning read-in switch 13, comes via a lead 24 at the output of a bucking trigger 25. Bucking trigger 25 can be turned On, by applying +40 volts to its left hand input from the +40 volts supply via cam contact CB1, point 26, and via lead 27, frame 28, the hole in the card 10, pin 29, lever 31, contact strip 32 and storage entry plug wire 33. Bucking trigger 25 can be turned Off, by applying +40 volts to its right hand input from the +40 volt supply, via cam contact CB1, point 26, and via a cam contact CB2, point 36 and a lead 38. Bucking trigger 25, may also be turned Off, by the +40 volts applied via cam contact CB3, a lead 39, point 36 and the lead 38 to its right hand input.

To understand the operation of the circuit of Fig. 1, it will be described in conjunction with the timing chart of Fig. 3. The card 10 is sensed statically, in a manner to be more fully described later. Suffice it to say at the present time, that there is a separate pin 29 for every possible hole in the card 10. In being sensed, the pins 29 fall into the holes and the lever 31 is moved across the tops of the pins 29 to test for those pins which are in the holes. The lever 31 first tests the pins in the "X" index position, and then sequentially tests the "5," "3," "1" and "0" index positions. The times during which the lever 31 makes complete contact with the pins 29, in the "X," "5," "3," "1" and "0" index positions, are known respectively as "X," "5," "3," "1" and "0" index times. The fact that the "X" index position can be sensed, before the "5" index position, is known as "early X" and will be discussed more fully later. Fig. 3 shows the different index times and the making and breaking of contact between the lever 31 and the pins 29. The fact that the lever 31 makes contact with the pins 29, slightly before, and breaks contact, slightly after, the different index times, is purely arbitrary, as the time of making and breaking contact could just as well have been called the beginning and end of index time.

Cam contact CB1 (Fig. 1) closes at the beginning and opens at the end of index times "5," "3," "1" and "0" (Fig. 3). With cam contact CB1 closed and lever 31 over a pin 29 in a hole of the card 10, a circuit is completed (Fig. 1) from the +40 volt supply through CB1 and the hole in the card 10 to the left hand input of bucking trigger 25, turning it On. When bucking trigger 25 is On its right hand output is positive, thus conditioning read-in switch 13. With read-in switch 13 conditioned, high frequency pulses coming from the pulse generator 23 via master switch 16 and line 15 to the other input of read-in switch 13 pass through to the storage unit 11.

The development of the high frequency pulses will be described in detail later but for the present, it is only necessary to know that the pulse generator produces five high frequency pulses, during "5" index time, two high frequency pulses, during "3" index time, and one high frequency pulse, during both "1" and "0" index times (as shown in Fig. 3). Cam contact CB7 is closed, from the beginning of "X" index time to the end of "0" index time (as shown in Fig. 3) and thus +40 volts is applied via CB7 (Fig. 1) to constantly condition the master switch 16 during this read-in time to allow the pulses from the pulse generator 23 to pass through to read-in switch 13, from where it will pass to storage unit 11, if bucking trigger 25 is On.

Bucking trigger 25 may be turned Off by cam contact CB3 which upon closing, completes a circuit from the +40 volt supply through line 39, point 36 and line 38 to the right hand input of bucking trigger 25. From Fig. 3, it will be seen that cam contact CB3 operates before "5" index time and after "5" index time. This insures that bucking trigger 25 is reset Off, before "5" index time and after "5" index time, for reasons which will become apparent later.

Cam contact CB2 closes shortly before, and opens shortly after, "0" index time (Fig. 3). When cam contact CB1 closes at the beginning of "0" index time, the circuit (previously described) completed via cam contacts CB1 and CB2 to the right hand side of bucking trigger 25, tends to turn it Off. However, it is possible that at the same time there is a "0" hole in the card, and thus there will also be a circuit completed to the left hand side of bucking trigger 25 (as previously described) via cam contact CB1, pin 29, the "0" hole and lever 31, tending to turn bucking trigger 25 On. When circuits are thus completed, to both sides of bucking trigger 25, it will remain in its previous state (as described above). Whether the bucking trigger remains in its previous state or is turned Off depends on the pecularities of the code, and, therefore, bucking trigger 25 must be controlled to meet the four following fixed conditions.

*Condition 1.*—If the bucking trigger 25 has been turned On, because of a "3" or "1" hole, in a column of the card, and if there is also a "0" hole, in that column of the card, the "0" hole has the value of one (as previously described) and bucking trigger 25 must remain On to allow the one pulse from pulse generator 23 to pass through to the storage unit 11.

*Condition 2.*—If the bucking trigger 25 has been turned On, because of a "3" or "1" hole, in a column of the card, and if there is no "0" hole, in that column of that card, the bucking trigger 25 must then of necessity be turned Off.

*Condition 3.*—If the bucking trigger 25 has not been turned On, because there is neither a "3" nor a "1" hole, in that particular column of the card, and if there is a "0" hole, in that column of the card, the "0" hole has the value of zero (as previously described) and bucking trigger 25 must remain Off, to prevent the one pulse from the pulse generator from passing through to the storage unit 11.

*Condition 4.*—If the bucking trigger 25 has not been turned On, because there is neither a "3" nor a "1" hole, in that particular column of the card, the bucking trigger 25 must remain Off, if there is also no "0" hole in that column of the card.

To better understand the conjoint operation of the bucking trigger 25 and the rest of the read-in circuit, of Fig. 1, this circuit will be described, in conjunction with the timing chart of Fig. 4, for each digit from zero to nine.

*A zero in the card*

If there is a zero in a column of the card, it can be seen from Fig. 2 that the zero will be represented by a hole in the "0" index position of that column.

No pulses can enter the storage unit 11 prior to "5" index time, because, as described later, there are no high frequency pulses developed by the pulse generator until some time during "5" index time. Between "X" and "5" index time, cam contact CB3 closes (Fig. 3) to reset bucking trigger 25 Off (Fig. 1) in a manner previously described.

Once again, it must be recalled that no high frequency pulses from the pulse generator 23 will pass through read-in switch 13 to the storage unit 11 unless the bucking trigger 25 is On, to condition read-in switch 13. To turn bucking trigger 25 On, lever 31 must contact a pin 29 which has fallen through a hole in the card, and cam contact CB1 must make. At "5" index time, the lever 31 is over the "5" index position, but, since there is no hole in the card under the condition assumed above, no circuit is completed to turn On bucking trigger 25, and, even though pulse generator 23 develops five pulses, these will not pass through read-in switch 13.

Between "5" and "3" index time, cam contact CB3 again closes (Fig. 3) to turn Off bucking trigger 25 but since bucking trigger 25 is already Off, it has no effect. The reason for cam contact CB3 operating at this time will be obvious presently.

At "3" index time, the pulse generator will develop two pulses, but since there is no hole in the "3" index position, bucking trigger 25 will not be turned On, to condition read-in switch 13 and, therefore no pulses will be transmitted into storage unit 11.

At "1" index time, one pulse is generated but since there is no hole in the "1" index position, there will be no pulses transmitted to the storage unit 11.

At "0" index time, one pulse is generated by the pulse generator 23, and since there is a "0" in the card, the bucking trigger 25 must be prevented from going On or one pulse will enter the storage unit. Obviously, this would be an error because when there is a zero digit in the card, no pulses should enter the storage unit. In this case, condition 3, described above, is met, under which bucking trigger 25 has not been turned On, because there is neither a "3" or "1" hole in the card, and the bucking trigger 25 is to remain Off since there is also a "0" hole in the card. From Fig. 3, it can be seen, that simultaneously the lever 31 makes contact at "0" index time with the pin 29 which has fallen through the "0" index hole in the card, and cam contact CM2 closes; both occurring, shortly before "0" index time. A circuit is thus completed from the left side of bucking trigger 25 (Fig. 1) via the lever 31, pin 29 and the "0" index hole in card, to cam contact CB1, and another circuit is completed, from the right side of bucking trigger 25, via cam contact CB2 to cam contact CB1. Therefore, at "0" index time, when cam contact CB1 closes, +40 volts is simultaneously applied, via cam contact CB1, to both sides of bucking trigger 25. The nature of the bucking trigger, as described above, is such that when pulsed simultaneously on both sides, it will remain in its previous condition, which in this case, is Off. Therefore, read-in switch 13 will not be conditioned so that the pulse, from the pulse generator 25, will not pass through to storage unit 11.

All this is illustrated in Fig. 4, wherein it can be seen that for the digit zero, there are no pulses indicated as passing to the storage unit, for index times "5," "3" and "1." At "0" index time, the words No Pulse indicate, that even though there is a hole, in the "0" index position, no pulse will enter the storage unit at that time.

*A one in the card*

A one in a column of the card is represented by a hole in the "1" index position of that column (Fig. 2).

At "5" index time, when cam contact CB1 closes, bucking trigger 25 remains Off since there is no hole in the card to complete a circuit to the left hand input of bucking trigger 25. Since bucking trigger 25 is not turned On to condition read-in switch 13, the five pulses developed by the pulse generator, at this time, will not be transmitted to storage unit 11.

At "3" index time, the pulse generator will develop two pulses, but since there is no hole in the "3" index position, bucking trigger 25 will not be turned On and no pulses will be transmitted into storage unit 11.

At "1" index time, since there is a hole, in the "1" index position, when cam contact CB1 closes, at this time, the bucking trigger 25 is turned On by the circuit completed to its left hand input. Turning bucking trigger 25 On, conditions read-in switch 13, to permit the one pulse, generated by the pulse generator at this time, to pass through to the storage unit 11.

Going into "0" index time, the bucking trigger 25 is still On so that something must be done to turn it Off or the one pulse, generated by the pulse generator 23, at this time will enter the storage unit. Since one pulse has previously entered the storage unit at "1" index time, the transmission of another pulse to the storage unit would be an error. In this case, condition 2, stated above, is met, wherein bucking trigger 25 has been turned On, due to a "1" hole in the card, and since there is no "0" hole in that card, the bucking trigger is to be turned Off.

From Fig. 3, it can be seen that cam contact CB2 closes, shortly before "0" index time so that when cam contact CB1 closes, at the beginning of "0" index time, a circuit is completed, to the right hand input of bucking trigger 25, tending to turn it Off. Since there is no "0" hole in the card, no circuit tending to turn bucking trigger 25 On, will be completed to its left hand side so that bucking trigger 25 will be turned Off and the read-in switch 13 will not be conditioned, and the one pulse, from the pulse generator 25, at this time, will not pass through to storage unit 11.

The fact that for the digit one, one pulse passes through to the storage unit 11, at index time "1" and at no other time, as indicated in Fig. 4.

*A two in the card*

If there is a two in a column of the card, it can be seen from Fig. 2, there will be holes in both the "1" and "0" index positions of that column.

At "5" index time, the lever 31 is over the "5" index position but since there is no hole, no circuit will be completed to turn On bucking trigger 25 and even though pulse generator 23 develops 5 pulses, these will not pass through read-in switch 13.

At the "3" index time, the pulse generator will develop two pulses but since there is no hole in the "3" index position, bucking trigger 25 will not be turned On to condition switch 13, and, therefore, no pulses will be transmitted into storage unit 11 at this time.

At "1" index time, since there is a hole in the "1" index position, when cam contact CB1 closes, at this time, the bucking trigger 25 is turned On by the circuit completed to its left hand input. Turning bucking trigger 25 On, conditions read-in switch 13, to permit the one pulse, developed by the pulse generator at this time, to pass through to the storage unit 11.

Going into "0" index time the bucking trigger 25 is still On, and it must remain On, to allow one more pulse to enter the storage unit. In this case, "condition 1," stated above, is met, wherein bucking trigger 25 is On due to a "1" hole in the card, and the bucking trigger 25 is to remain On, if there is also "0" hole in the card. From Fig. 3, it can be seen that simultaneously, the lever 31 makes contact at "0" index time, with the pin 29 which has fallen through the "0" hole in the card, and cam contact CB2 closes; both occurring shortly before "0" index time. Thus, at "0" index time, when CB1 closes, +40 volts is applied simultaneously to both sides of bucking trigger 25. The nature of the bucking trigger 25 is such that when pulsed simultaneously on both sides, it will remain in its previous condition, which in this case, is On. Therefore, read-in switch 13 will remain conditioned, and the pulse, generated by the pulse generator 25 at this time, will pass through to storage unit 11.

All this is indicated in Fig. 4, wherein it can be seen, that for the digit two, there are no pulses indicated as passing to the storage unit 11, during index times "5" and "3", but there is one pulse transmitted, at both the "1" and "0" index times, making a total of two.

*A three in a card*

A three in a column of a card is represented by a hole in the "3" index position of that card (Fig. 2).

Again, since there is no hole in the "5" index position of the card, bucking trigger 25 will not be turned On, and the 5 pulses developed by the pulse generator 23 at this time will not be transmitted to storage unit 11.

At "3" index time, since there is a hole in the "3" index position, when cam contact CB1 closes at "3" index time, bucking trigger 25 is turned On, conditioning read-in switch 13, to permit the two pulses generated by the pulse generator 23 at this time (Fig. 3) to pass through to the storage unit 11, as indicated in Fig. 4.

At "1" index time, there is no hole in the card for completing a circuit to the left hand side of bucking trigger 25 and CB2 does not close at this time for completing the circuit to the right hand side of bucking trigger 25. Thus, trigger 25 remains, in its On condition so that read-in switch 13 is still conditioned, to permit the one pulse generated by the pulse generator 23 at "1" index time to pass through to the storage unit 11.

Going into "0" index time, the bucking trigger 25 is still On and since there is no "0" hole in the card, the bucking trigger must be turned Off. In this case, the "condition 2", stated above, is met, wherein bucking trigger 25 is On due to a "3" hole in the card and, is to be turned Off since there is no "0" hole in the card. From Fig. 3, it can be seen that cam contact CB2 closes, shortly before "0" index time, and completes a circuit (Fig. 1) to the right hand side of bucking trigger 25. Since there is no "0" hole in the card, there is no circuit completed to the left hand side of bucking trigger 25, so that when cam contact CB1 closes at "0" index time, +40 volts is applied, only to the right hand side of bucking trigger 25, turning it Off. Therefore, read-in switch 13 will not be conditioned, and the one pulse, developed by the pulse generator 25 at "0" index time, will not pass through to the storage unit 11.

Fig. 4 indicates that for the digit 3, two pulses are transmitted to the storage unit at "3" index time, and one pulse at "1" index time, making a total of three pulses.

*A four in the card*

If there is a four in the column of a card, it can be seen from Fig. 2 that there are holes in both the "3" and "0" index positions of that column.

For the "5", "3" and "1" index position, the circuit will operate the same, for the digit 4 in the card, as it did for the digit 3, to transmit three pulses to the storage unit 11.

Going into "0" index time, the bucking trigger 25 is still On, and it must remain On, to allow one more pulse to enter the storage unit. In this case, "condition 1", stated above, is met, wherein bucking trigger 25 is On, due to a "1" hole in the card, and, the bucking trigger 25 is to remain On since there is also a "0" hole in the card. From Fig. 3, it can be seen that simultaneously, the lever 31 makes contact at "0" index time, with the pin 29 which has fallen through the hole in the card, and cam contact CB2 closes; both occurring shortly before "0" index time. Thus, at "0" index time, when CB1 closes, +40 volts is applied simultaneously to both sides of bucking trigger 25, and it will remain in its present On condition. Therefore, read-in switch 13 will be conditioned, and the pulse generated by the pulse generator 25 at "0" index time, will pass through to storage unit 11, to make a total of four pulses.

All this is indicated on Fig. 4 wherein it can be seen, that for the digit 4, there is no pulse indicated, as passing through to the storage unit for index time "5", but that there are two, one and one pulses, respectively, passing to the storage unit, at index times "3", "1" and "0", making a total of four pulses.

*Five, six, seven, eight and nine in the card*

It can be seen from a study of Fig. 2 that the digit five is represented by holes in the "5" index position and in the "0" index position. Likewise, the digits six, seven, eight and nine, respecttively, are each represented by holes in the "5" index position plus holes representative respectively of the digits one, two, three and four. It is obvious then that after a determination is made as to whether there is or is not a "5" index hole, the operation of the circuit, for the digits 5 to 9, can be the same as for the digits 0 to 4. To make this possible, the bucking trigger 25 is reset Off by cam CB3 (Figs. 3 and 1) between "5" and "3" index time. This is to insure that if there were a hole, in the "5" index position, to turn On bucking trigger 25 and effect a transmission of five pulses to the storage unit 11, the resetting Off of the bucking trigger 25 would allow the circuit to operate, thereafter, as explained for digits zero to four.

For example, where there is a five, in a column of the card, there are holes in the "5" and "0" index positions. At "5" index time, since there is a hole in the "5" index position, when cam contact CB1 closes at "5" index time, the bucking trigger 25 is turned On, by the circuit completed via the "5" index hole, pin 29 and lever 31, to the left hand input of trigger 25. Turning bucking trigger 25 On conditions read-in switch 13, to permit the five pulses, generated by the pulse generator 25 at "5" index time, to pass through to the storage unit 11.

Between "5" and "3" index times, cam contact CB3 closes, to turn Off bucking trigger 25. Since the trigger 25 is thus Off, going into "3" index time, the circuit will henceforth operate exactly the same as if there were just a zero in the card. All this is indicated in Fig. 4, wherein it can be seen, that for the digit 5, there are five pulses indicated as passing to the storage unit, during index time "5", and, just as for the digit zero, there are no pulses transmitted, during index times "3", "1" and "0". There is thus a total of five pulses transmitted to the storage unit 11.

From Fig. 4, it can be observed that when there is a digit six, in a column of a card, five and one pulses, respectively, are transmitted to the storage unit 11, at "5" and "1" index times making a total of six pulses. When there is a seven in a column of a card, five, one and one pulses, respectively, are transmitted to the storage unit 11 at "5", "1" and "0" index times, making a total of seven pulses. When there is an eight, in a column of a card, five, two and one pulses, respectively, enter the storage unit 11 at "5", "3" and "1" index times, making a total of eight pulses. When there is a digit nine, in a column of the card, five, two, one and one pulses, respectively, are transmitted to the storage unit 11 at "5", "3", "1" and "0" index times, making a total of nine pulses.

*Preferred form of read-in circuit*

The complete embodiment of the preferred form of the read-in circuit is shown in Figs. 5A and 5B, and it will now be compared to the flow diagram of Fig. 1, described in detail above.

Fig. 5A illustrates the complete detailed circuit of the pulse generator box 23 of Fig. 1. The output of the pulse generator of Fig. 5A feeds through a lead 50, to one input of a master switch 51 (Fig. 5B) of the PS-2 type (Fig. 24) which is comparable to the master switch 16 of Fig. 1. The other input to master switch 51 can be traced back to cam contact CB7, as in Fig. 1. The output of master switch 51 feeds from pin 4 through an inverter 204 of the IN-5 type (Fig. 19) to the respective input terminals "9" of five read-in switches 53 to 57 of the PS-3 type (Fig. 25). The output of each of the read-in switches 53 to 57 feeds respectively each of the electronic Storage Unit positions 61 to 65. Five Storage Unit positions have been shown for purposes of illustration but it is to be understood that any number of positions can be used, the number depending only on the digit capacity required. The conditioning voltage for the read-in switches 53 to 57 come through input terminals "7" from TR-43 type (Fig. 16) bucking triggers 66 to 70. These bucking triggers are turned On and Off by sensing units and cam contacts CB1, CB2 and CB3, in a manner as described in connection with Fig. 1. This sensing circuit will be described in more detail presently.

*Pulse generator*

The pulse generator, as shown in Fig. 5A, functions as described generally below, to deliver 5, 2, 1 and 1 pulses (in bursts, at mechanically timed intervals, synchronized with the movement of the sensing elements across the record card.

The source of basic operating pulses for said pulse generator comprises a multivibrator 80, which supplies a series of so-called "A" pulses on line 95, as described presently, which are produced at the rate of 50 kc., and a series of so-called "B" pulses on line 96 which are produced at the same rate, but 180° out of phase with the "A" pulses, these being illustrated diagrammatically in Fig. 7. The "B" pulses drive a timer circuit, which will be described in more detail presently, and which comprises a series of seven triggers 101–107, cascade connected in a "ring circuit."

When successive "B" pulses are applied to the ring, it goes through a complete cycle and develops pulses (or voltage conditions) at certain times in the cycle. These pulses are controlled by cams in a manner to be described later, and act as gating means to in turn control a switch, which is thus permitted to transmit a predetermined number of "A" pulses. It is these "A" pulses which are the output of the pulse generator.

*A and B pulses*

A multivibrator of the MV-1 type (Fig. 7) and labeled 80 (Fig. 5A) is the source of the high speed pulses developed by the pulse generator. This multivibrator, as previously stated, produces pulses at its output terminal "9", which are only approximately square topped. Since these are not true square waves, means are provided to shape the pulses into square waves. This comprises triode clippers, as described next, which utilize only a portion of the waveform from the multivibrator to produce perfect square waves, all in a well known manner.

The output terminal "9" of multivibrator 80 (Fig. 5A)

is connected, in parallel, via a lead 81, to two triode inverters 82 and 83 (of the IN-13 type, Fig. 20), which have commonly connected input and output terminals. This parallel connection of inverters is known as the first clipper. The output of the first clipper is fed via a lead 85 to a second clipper, which comprises a dual-triode type IN-36 inverter 86 (see also Fig. 23). The commonly connected outputs of this second clipper 86 is connected, via leads 87 and 88, to both a PW-7 type power tube 89 (see also Fig. 11) and to another dual triode type IN-36 inverter 90 comprising a third clipper. The outputs of this third clipper 90 commonly connected via lines 91 and 92 are in turn connected, via lead 93, to another PW-7 type power tube 94.

The input to the first clipper 82 and 83 comprises the output of the multivibrator 80 and each time a negative pulse appears at the input of the first clipper 82 and 83, a negative pulse also appears at the output of the second clipper 86 and a positive pulse appears at the output of the third clipper 90, and obviously, with a positive input pulse, the reverse is also true.

Both the second and third clippers are capacitively coupled (see Fig. 23) to the normally conducting power tubes 89 and 94. Since such normally conducting tubes will recognize only negative pulses, the first power tube 89 will produce a positive output pulse only when the output of the clipper 86 goes negative, and the power tube 94 will produce a positive output pulse only when the output of the clipper 90 goes negative. The pulses produced by the first power tube on lead 95, are known as "A" pulses, while the pulses produced by the second power tube on lead 96 are known as "B" pulses. It is thus apparent that each time the input to the first clipper 82 and 83 goes negative, an "A" pulse is produced and that, likewise, each time the first clipper 82 and 83 input goes positive, a "B" pulse is produced, the timing of these "A" and "B" pulses being shown in Fig. 7. At 50 kc. operation, the "A" pulses (or "B" pulses) occur at 20 microseconds intervals and each pulse is of 10 microseconds duration. It is apparent then, that in any train of pulses, the "A" pulses always occur first, and the "B" pulses always occur next.

The timer and gating means

Basically, the timer is a ring of electronic triggers (of the type generally as shown in the Overbeck Patent 2,404,918), each of said triggers comprising a pair of cross coupled triodes. The timer ring illustrated in Fig. 5A and described presently consists of 7 timer triggers, only one being On at any particular time. Upon simultaneous application of a pulse to all of the triggers of the ring, as described in said Overbeck patent, that particular stage which is On, and that one only, goes Off, and in going Off flips the next stage On. With each incoming pulse, the ring advances one step.

Figure 13:
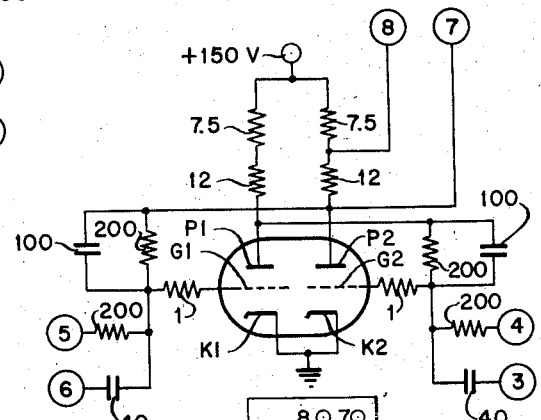
Figure 14:
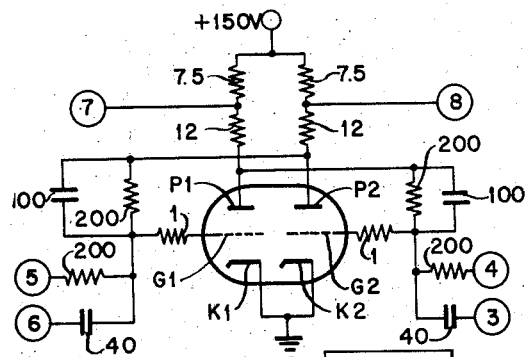
Figure 15:
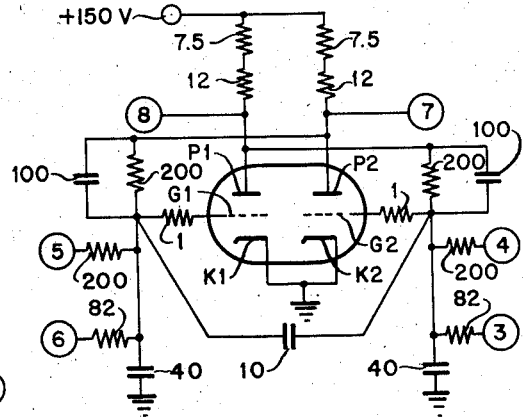
Figure 16:
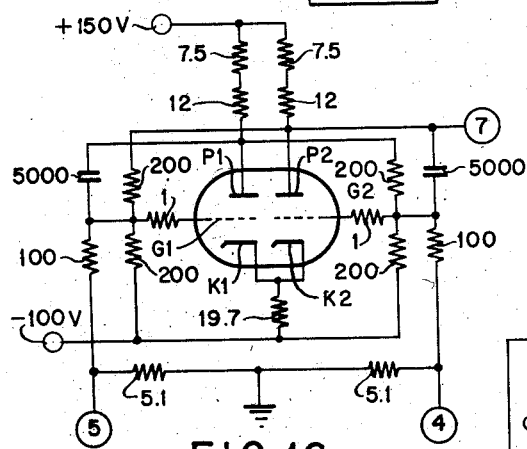
Figure 17:
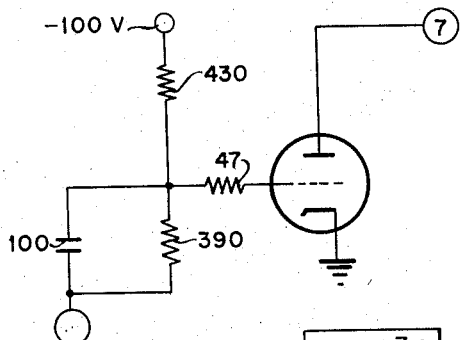
Figure 18:
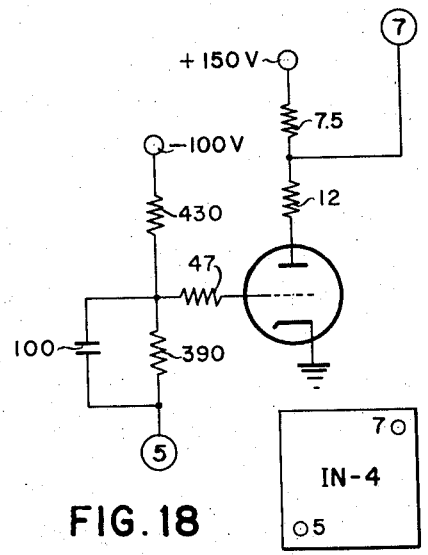
Figure 19:
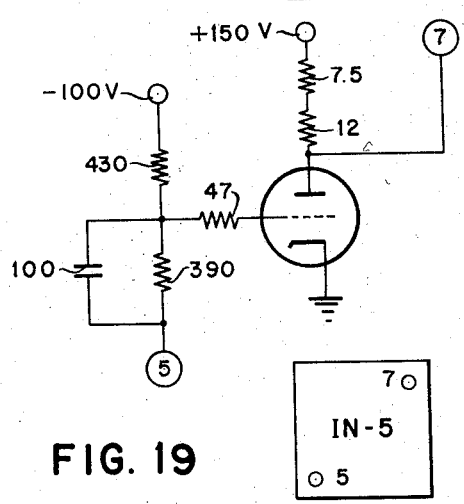
Figure 20:
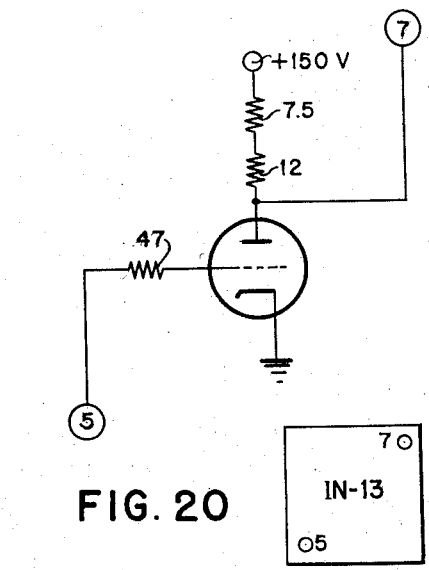
Figure 21:
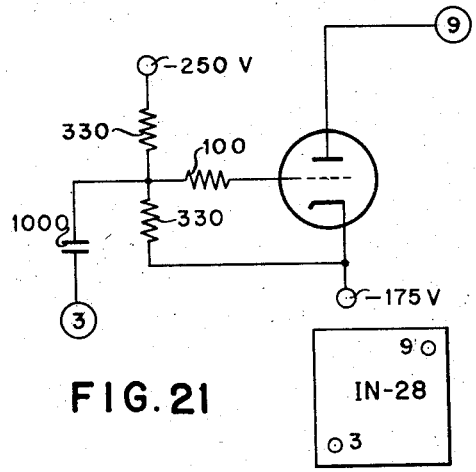
Figure 22:
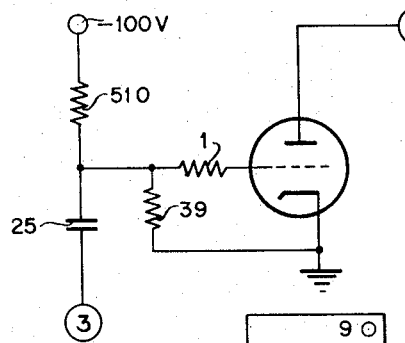
Figure 23:
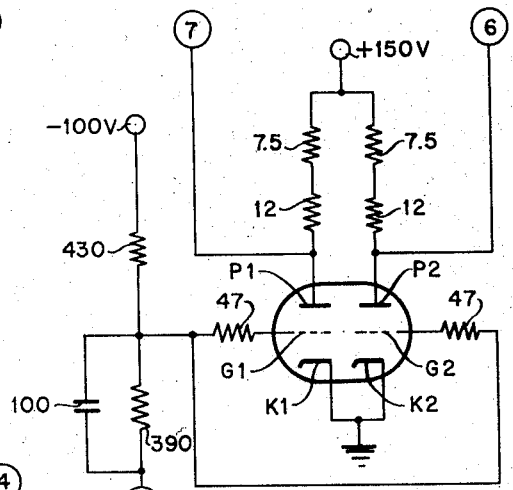

The timer ring (Fig. 5A) comprises the cascaded triggers 101 to 107 inclusive. Triggers 101 to 106 inclusive, are of the type TR-13 (Fig. 14), while trigger 107 is a type TR-1 (Fig. 13).

A lead 110 is connected to the input terminal "5" of trigger 101 and leads 111 to 116 are connected to input terminals "4" of triggers 102 to 107, respectively. Leads 110 to 116 are commonly connected via a lead 117 and a normally closed cam contact CB5 to a —100 volt supply 118. When cam contact CB5 opens, the —100 volt supply is removed from lead 117 and from leads 110 to 116, causing these leads to go effectively positive. Trigger 101 will then be reset On due to the connection to its input 5 while all the other triggers in the ring are reset Off, in a manner previously described.

Leads 119 to 124, inclusive, respectively, connect the right hand output of each of the triggers 101 to 107 inclusive, to the right hand inputs of the respective succeeding trigger, while lead 125 (Fig. 5A) connects the output terminal "8" of the last trigger 107 (Fig. 5B) to the input of an IN-5 type inverter 126. The output terminal "7" of inverter 126 is connected via a lead 127 to an IN-4 type inverter 128 whose output terminal "7" is connected to a lead 129.

An input lead 130 (Fig. 5A) supplied with positive "B" pulses via lead 96 and a cam contact CB8 is connected to the input of an IN-4 type inverter 131. The output of inverter 131 is connected via a lead 132 and via leads 133 to 139, respectively, to each of the left hand inputs of all the seven timer triggers.

The output of inverter 131 will be negative "B" pulses and the first negative input pulse on line 132 acts via line 133, to turn Off trigger 101 which, as stated, has been initially reset On, but this pulse does not affect any of the other triggers since they have been reset Off. When trigger 101 goes Off, its plate P2 (Fig. 14) goes negative, as previously described, and this negative swing is applied from its output terminal "8" via line 119 to the input terminal "3" of trigger 102 to thus turn this trigger 102 On. The next pulse on line 132 acts via line 134 to turn Off trigger 102 which thus turns trigger 103 On. This stepping process continues until the last trigger 107 goes Off, at which time all seven of the ring triggers are Off.

When timer trigger 102 went On, as described above, its terminal "7" went negative and applied a negative pulse via a lead 140 to a TR-4 type gating trigger 141, turning it On. Three "B" pulses later, timer trigger 105 went On and applied a negative pulse via its terminal "7" and a lead 142 to a gating trigger 143. One "B" pulse after that, timer trigger 106 went On, and in a similar manner, via a lead 144, turned On a gating trigger 145. On the next "B" pulse, timer trigger 107 was turned On and applied a negative voltage via lead 125 to inverter 126 where it was inverted and applied via lead 127 to inverter 128 where it was reinverted and applied as a negative voltage to its output lead 129. The output lead 129 of inverter 128 is connected via leads 151, 152 and 153, respectively, to the left hand inputs of gating triggers 141, 143 and 145. The negative voltage on lead 129, therefore, applied to the left hand inputs of gating triggers 141, 143 and 145 turns them Off.

Lead 117 which comes from the reset cam CB5 is also connected to lead 154, which via leads 155, 156 and 157 is connected to the gating triggers 141, 143 and 145, respectively. Gating triggers 141, 143 and 145 are thus also reset when CB5 opens, at times to be described later.

The output terminal "7" of gating trigger 141 is connected via a lead 158 to the input of an IN-3 type inverter 159 whose output terminal is connected via a normally open cam contact CB50 and a lead 160 to a lead 161. The output terminal "7" of gating trigger 143 is connected via a lead 162 to the input of an IN-3 type inverter 163 whose output terminal is connected via a normally open cam contact CB51 and a lead 164 to the lead 161. The output terminal of gating trigger 145 is connected via a lead 165 to the input of an IN-3 type inverter 166 whose output terminal is connected to one side of two parallel connected cam contacts CB52 and CB53. From the other side of cam contacts CB52 and CB53, there is a connection via leads 167 and 164 to lead 161. Lead 161 is connected via a 20K ohm resistor 168 and line 169 to a +150 volt supply 170. This resistor 168 acts as the plate load resistor for inverters 159, 163 or 166 in a manner to be presently described.

The lead 161 is also connected via lead 171 to the input of an IN-5 type inverter 172 whose output is connected via a lead 173 to an input terminal "9" of a PS-2 type switch 174. The input terminal "7" of switch 174 is connected to the above described lead 95 which is the source of +A pulses. The output of switch 174 is connected via a lead 175 to a PW-2 type power tube 176 whose output terminal is connected to the lead 50 which as stated above, comprises the output of the pulse generator.

For a clearer picture of the operation of the pulse generator, the circuit of Fig. 5A will now be described, in conjunction with the timing charts of Figs. 6 and 7, for each of the card index points, 5, 3, 1 and 0, respectively.

*Card index time "5"*

Referring to Fig. 6, it is seen that cam contact CB5 opens during the time between card index time "X" and card index time "5." As has been previously described, when cam contact CB5 (Fig. 5A) opens, the timer ring is reset with trigger 101 On and triggers 102 to 107 Off. Also, when cam contact CB5 is opened, a circuit from the −100 volt source 118 is broken by this cam contact CB5, which leads to lines 117, 154 and to leads 155, 156 and 157, connected to the input terminals "4" of the gating triggers 141, 143 and 145, respectively. Thus, when CB5 opens, prior to index time "5," terminals "4" of the gating triggers 141, 143 and 145 go effectively positive, resetting these triggers Off.

From Fig. 6, it is seen that cam contact CB8 (Fig. 5A) closes shortly after the beginning of card index time "5" and opens shortly before the end of card index time "5." When cam contact CB8 (Fig. 5A) closes, it completes a circuit from the source of "B" pulses 96 (previously mentioned) via this cam contact CB8 and lead 130 to the inverter 131 and then via lead 132 to the timer ring. Referring to Fig. 7, −B pulses are shown starting to the ring circuit via lead 132 after cam contact CB8 makes. Fig. 7 shows only a portion of "5" index time, and it can be observed that the time known as index time is very large compared to the length of one of the high speed pulses.

When the first full negative "B" pulse is applied to the timer ring, trigger 102 goes On (Fig. 5A) and its left hand output at lead 140 goes negative (as shown in Fig. 7). Lead 140 going negative turns gating trigger 141 On (Fig. 5A), and its output at lead 158 rises (Fig. 7). This positive voltage is applied to the IN-3 type inverter 159. From Fig. 17, it can be seen that an IN-3 type inverter does not have its own plate load resistor. Thus, even though a positive voltage is applied to inverter 159, it will not conduct to give a negative output unless a plate voltage supply is connected to its plate. This is accomplished, when cam contact CB50 closes, completing the circuit from the inverter 159 via lead 160, lead 161 to resistor 168, line 169 and the +150 volt supply 170. From Fig. 6, it can be observed that cam contact CB50 is closed only during the entire card index time "5." The negative output of inverter 159 is thus applied to inverter 172 during card index time "5" only, which then has a positive output at lead 173. It can thus be understood that if lead 158 goes positive, while cam contact CB50 is closed at "5" index time, then lead 173 also goes positive (Fig. 7). The positive output at lead 173 is the beginning of a positive gating voltage which is applied to switch 174 to condition it so that the +A pulses (Fig. 7) on the other input of switch 174 (Fig. 5A) start to pass through switch 174 as −A pulses on lead 175 (Fig. 7). These −A pulses are inverted to plus by power tube 176 so that the output pulses on lead 50 which is the output of the pulse generator, are plus.

"B" pulses continue to feed the ring circuit, each pulse stepping the On condition along. Five "B" pulses after ring trigger 102 is turned On, ring trigger 107 is turned On, and its left hand output on lead 125 goes negative. This negative pulse is inverted by inverter 126 and reinverted by inverter 128 whose output 129 is connected to the lead 151, which, therefore, goes negative (Fig. 7) effecting the turning Off of gating trigger 141. When gating trigger 141 goes Off, its right hand output on line 158 goes negative. When lead 158 thus goes negative, with cam contact CB50 closed, lead 173 will also go negative (Fig. 7) ending the positive gating voltage applied to one grid of switch 174 and thus preventing any further +A pulses on the other grid from passing through switch 174. Since the gating voltage ends, after the fifth "A" pulse has passed through switch 174 to lead 175, 5 pulses are thus emitted from the pulse generator at the "5" index time.

*Card index time "3"*

Referring to Fig. 6, it is seen that cam contact CB5 (Fig. 5A) opens between index times "5" and "3" resetting the timer ring, as previously described, with trigger 101 On and triggers 102 to 107 Off. Cam contact CB5 opening also resets gating triggers 141, 143 and 145 Off. From Fig. 6, it can also be observed that cam contact CB8 (Fig. 5A) closes shortly after the beginning of index time "3" and opens shortly before the end of index time "3." Upon closing, it starts the −B pulses to the timer ring circuit as previously described (see Fig. 7 for "3" index time).

When the fourth full negative "B" pulse is applied to the timer ring via lead 132, trigger 105 goes On (Fig. 5A), and its left hand output to lead 142 goes negative (as shown in Fig. 7). When lead 142 goes negative, it turns gating trigger 143 On (Fig. 5A), and its output at lead 162 rises (Fig. 7). This positive voltage is applied to the IN-3 type inverter 163 which, however, will not conduct to give a negative output, until cam contact CB51 closes to complete a plate circuit for the inverter 163 via lead 161 to resistor 168 and the +150 volt supply 170. From Fig. 6, it is seen that cam contact CB51 is closed during the index time "3" only. The negative output of inverter 163 is then applied to inverter 172 which has a positive output at lead 173. It can thus be understood that if lead 162 goes positive, when cam contact CB51 is closed at "3" index time, then lead 173 also goes positive (Fig. 7).

"B" pulses continue to be fed to the ring circuit, and two "B" pulses after ring trigger 105 is turned On, ring trigger 107 is turned On, and its left hand output at lead 125 goes negative (as shown in Fig. 7). This negative pulse is inverted by inverter 126 and reinverted by inverter 128 whose output 129 is fed to the lead 152, which, therefore, goes negative, turning Off gating trigger 143. When gating trigger 143 goes Off, its right hand output 162, which is fed to lead 162 goes negative. When lead 162 goes negative, with cam contact CB51 closed, lead 173 will also go negative (Fig. 7) ending the positive gating voltage applied to one grid of switch 174 and thus preventing further +A pulses on the other grid from passing through switch 174. Since the gating voltage ends after the second A pulse has passed through switch 174 to lead 175, at "3" index time, two negative pulses appear on line 175 (Fig. 7) and thus two plus pulses are emitted from the pulse generator over its output line 50.

*Card index time "1"*

Referring to Fig. 6, it is seen that cam contact CB5 (Fig. 5A) also opens between index times "3" and "1" resetting the timer ring, as previously described, with trigger 101 On and triggers 102 to 107 Off. The opening of cam contact CB5 also resets gating triggers 141, 143 and 145 Off. From Fig. 6, it can also be observed that cam contact CB8 closes shortly after the beginning of index time "1" and opens shortly before the end of index time "1". Upon closing, cam contact CB8 starts the −B pulses to the timer ring circuit as previously described (see Fig. 7, for "1" and "0" index times).

When the fifth full negative "B" pulse is applied to the timer ring via lead 132, trigger 106 goes On (Fig. 5A) and its left hand output at lead 144 goes negative (as shown in Fig. 7). When lead 144 goes negative, it turns gating trigger 145 On (Fig. 5A) and its output at lead 165 rises (Fig. 7). This positive voltage is applied to the IN-3 type inverter 166, which, however, will not conduct to give a negative output until cam contact CB52 closes to complete a plate circuit from the inverter 166 via leads 167, 164 and 161 to resistor 168 and the +150 volt supply 170. From Fig. 6, it can be seen that cam contact CB52 is closed only during index time "1". One "B" pulse after ring trigger 106 is turned On, ring trigger 107 is turned On and its left hand output at lead 125 goes negative (Fig. 7). This negative pulse is inverted by inverter 126 and reinverted by inverter 128 whose output lead 129, therefore, goes negative, turning Off gating trigger 145. When gating trigger 145 goes Off, its right hand output at lead 165 goes negative. When lead 165 goes negative, with cam contact CB52 closed, lead 173 will also go negative (Fig. 7) ending the positive gating voltage applied to one grid of switch 174 and thus preventing further +A pulses on the other grid from passing through switch 174. Since the gating voltage ends after one A pulse has passed through switch 174 to lead 175, at "1" index time, one pulse only is emitted from the pulse generator.

*Card index time "0"*

Since one pulse is developed by the pulse generator at "0" index time, the circuit for generating that pulse is the same as the circuit for developing the one pulse, during "1" index time, except that cam contact CB53 (Figs. 5A and 6) closes during "0" index time to complete a plate circuit from the IN-3 type inverter 166 to its plate supply to allow the positive gate at lead 165 (Fig. 7) to condition switch 174. Therefore, at "0" index time, one pulse is emitted from the pulse generator.

To recapitulate, there are five, two, one and one pulses, transmitted from the pulse generator via lead 50 to the input terminal "7" of master switch 51. These pulses will pass though master switch 51 only if master switch 51 is conditioned for read-in, in a manner that will now be described.

*Conditioning the master switch*

Referring to Fig. 5B, it will be seen that cam contact CB7 has its transfer side connected to a +40 volt supply. The other side of cam contact CB7 is connected through lead 190, plug hub 191, read-in control panel wire 192, plug hub 193, and lead 194 to the transfer side of the contact of relay R1. The other side of this relay contact is connected to the left hand input of a TR-32 type (Fig. 15) master trigger 197.

Master trigger 197, must be in its On condition, for pulses from the pulse generator to be utilized, i.e., to pass through master switch 51 to the read-in switches 53 to 57. The above statement will be more fully appreciated presently.

Card index time "X" may be utilized in the control of master trigger 197, that is, as can be seen from Fig. 6 relay R1 is energized during card index time "X." (Relay coil R1, not shown in Fig. 5B is energized during card index time "X," and it is this relay R1 which can be controlled by other holes in the card to control read-in if desired.) When it is desired to turn master trigger 197 On, and thereby through means hereinafter disclosed, accomplish read-in to the electronic Storage Unit from any or all the columns of a record card, read-in control panel wire 192 is connected as shown (Fig. 5B).

From an inspection of the timing chart shown in Fig. 6, it will be seen that cam contact CB7 is closed from a little before card index time "X" to the end of card index time "0." This is known as read-in time and is actually just a portion of the full machine cycle. The rest of the machine cycle is used for calculating operations, in a well-known manner not here described. A short time after cam contact CB7 closes, the relay R1 is energized (at "X" index time) to complete a circuit from the +40 volt supply via cam contact CB7, read-in control panel wire 192 and the contact of relay R1 to the left hand input of master trigger 197, resulting in said master trigger 197 being turned On.

The right hand output of master trigger 197 is connected via a lead 200 to input terminal "9" of master switch 51. When master trigger 197 goes On, its right hand output at lead 200 goes positive and is applied as the conditioning voltage to master switch 51 for allowing the plus pulses from the pulse generator, applied to grid 7 of master switch 51, to pass through.

Before read-in time starts, it is necessary to reset master trigger 197 Off, so that it can be turned On selectively by relay R1. From Fig. 6, it can be seen that cam CB6 makes and breaks before cam CB7 makes. Cam contact CB6 (Fig. 5B) has its transfer side connected to a +40 volt supply and its other side connected via a lead 198 to the right hand input of master trigger 197. When cam CB6 makes, it completes a circuit from the +40 volt supply via cam contact CB6 to the right hand input of master trigger 197, resetting said master trigger 197 Off.

*Read-in switches and storage units*

There has been described means for developing a fixed number of high speed pulses, at certain machine index times, and a means for conditioning the master switch 51 (Fig. 5B) to permit these pulses to pass through when a read-in operation is desired.

The output terminal "4" of master switch 51 is connected via a lead 203 to an IN-5 type inverter 204 whose output is connected to a lead 205. Lead 205 is connected via leads 206 to 210, inclusive, respectively, to the input terminals "9" of read-in switches 53 to 57.

The positive pulses from the pulse generator which pass through and are inverted by master switch 51 are reinverted by inverter 204 and applied via the leads 206 to 210 to input terminals "9" of each of the read-in switches 53, to 57. Thus, each positive pulse impressed upon terminal "7" of master switch 51 is also impressed upon the "9" terminals of each of the read-in switches 53 to 57 inclusive.

The "7" terminals of each of the read-in switches 53 to 57, inclusive, are respectively connected, via leads 213 to 217, inclusive, to the right hand outputs of TR-43 type bucking triggers 66 to 70 inclusive. When any or all of the bucking triggers 66 to 70 are On, the right hand output terminals of the bucking triggers that are On, go positive and said positive voltages are applied to condition the respective read-in switches 53 to 57. Thus, while the pulses from the pulse generator are applied simultaneously to all the read-in switches 53 to 57, only those read-in switches, which are conditioned by their respective bucking triggers 66 to 70, will allow the pulses to pass through.

Read-in switch 53 has its output terminal "4" connected via a lead 220 to the commonly connected input terminals of a TR-4 type trigger 221 which is part of the electronic Storage Unit position 61. The electronic Storage Unit position 61 may actually be any form of electrical storage means capable of storing negative pulses of the magnitude and frequency that read-in switch 53 can deliver from its output terminal. As an example, there has been shown a Storage Unit position which essentially comprises an electronic counting circuit of the type disclosed in Patent 2,584,811, granted to Byron E. Phelps, on February 5, 1952. Storage Unit position 61 includes, besides trigger 221, three other cascade connected triggers 222, 223 and 224 interconnected, by means of an inverter 225, to produce certain feed backs, whereby the normal binary cascade operation is altered, to decade operation, as described in said above mentioned Phelps' patent. Other storage means, of the type that could be used with the circuit of Fig. 5B, is disclosed in each of the following Patents No. 2,562,591, granted to John L. Wagner et al. on July 31, 1951; No. 2,558,936, granted to Arthur H. Dickinson on July 3, 1951; No. 2,594,742, granted to Arthur H. Dickinson on April 19, 1952.

Read-in switches 54 to 57, inclusive, respectively, are connected via leads 230 to 233, inclusive, respectively, to storage positions 62 to 65 inclusive. Storage positions 62 to 65 are of the same type as storage position 61. In their pressed arrangement, storage positions 65, 64, 63, 62 and 61 represent respectively, the units, tens, hundreds, thousands and ten thousands order of a given number to be stored. The number in the five order storage means, disclosed herein, may be transmitted to other parts of the machine, via leads 235 to 239, inclusive, by means not shown.

Associated with the storage means is a reset circuit (i.e., a means for restoring all the storage orders to a 0 count), which will now be briefly described. It is essential to have a circuit capable of resetting the Storage Unit, prior to a calculation, in order to remove the information stored during a previous problem.

Referring to Fig. 5B, the output of master trigger 197 is connected via the lead 200 to a lead 240 and from there to the input of an IN-28 type inverter 241. The output of the inverter 241 is connected via a lead 243 to the input of a PW-1 type power tube 245 whose output is connected to a common lead 246. Common lead 246 is connected to each of the triggers in the Storage Unit via their terminals "4."

When master trigger 197 goes On, at the beginning of "X" index time (as previously described), its right hand output at lead 200 goes positive. This positive voltage is applied via lead 240 to inverter 241 where it is inverted and applied as a negative voltage to power tube 245. The output of power tube 245 at common lead 246, which was at −100 volts, then rises to ground potentials to cause all the storage triggers to be reset Off.

PS-41 (Figs. 5B and 26), whose terminal "4" is connected to lead 243 and whose terminal "5" is connected to lead 246, acts as a voltage regulator to keep exactly −100 volts on lead 246 during non-reset time in a manner well-known in the art.

Sensing means

In the accounting and calculating machines wherein this invention may be used, the record cards are successively fed out of a magazine to a sensing station and from there eventually to a stacker. At the sensing station, each card is halted momentarily and sensed electromechanically, while in a static condition, in a manner similar to that shown in the U.S. Patent No. 2,528,411, granted to H. S. Beattie et al.

At the sensing station, there are electromechanical devices comprising a full set of vertical sensing pins 300 (Fig. 5B), one for each index point position in every column of all banks of the card. The card 301 is fed from right to left, in the direction of its short dimension, face up, "X" first, and brought to a stop, under the pins 300, in a position as shown in Fig. 5B. The sensing mechanisms for columns 1 and 5 for all three decks A, B and C are shown in Fig. 5B (deck C being to the left). A brief description will now be given of the sensing mechanism for column 1 of the card 301 and it is to be understood that the mechanism operates in a similar manner for the other columns.

The pins 300 are normally held elevated until the card 301 stands in the sensing position, and then the pins 300 are lowered so that certain of them project through perforations and contact a frame 302 while others remain elevated or raised on the imperforate portions of the card 301. Cooperating with the heads of the pins 300 are four contact levers 303A, 303B, 303C and 303D, the one arm of each lever having a cam face which rides over the heads of its related pins 300 and, when a pin is in the depressed position, the lever is allowed to rock counterclockwise under the urging of a spring 304. When a lever is so rocked counterclockwise, its upper arm makes contact with one of the contact strips 305, 306 or 307, which are respectively connected to sensing hubs A-1, B-1 and C-1. Referring to Fig. 5B, it can be seen that the cam face of the arm of lever 303D is over the "X" index position pin. This pin does not project through a hole and so it is in the raised position, preventing lever 303D from rocking counterclockwise. In this position, the upper arm of lever 303D does not make contact with contact strip 307. However, it can be seen that the "X" index position pin, for deck A, is in its lowered position, projecting through a hole and in contact with frame 302, thus permitting lever 303B to be rocked counterclockwise to make contact with strip 305. Therefore, with an "X" hole, in column 1, deck A of the card, an electrical circuit is completed from the frame 302 via the lowered pin, the lever 303B, contact strip 305, to the sensing hub A-1. Generally then, when there is a hole in the card in a particular position, an electrical circuit will be completed from the frame 302 to the proper sensing hub, when the lever contacts the pin in the hole.

The levers in all the columns are all mounted on a common reciprocating frame 310 which is moved across the pins from right to left (Fig. 5B) while the cards are being sensing and then back to the right after the cards are sensed.

It has been shown that there are four sets of contact levers associated with the three sets of sensing pins in a column; the extra lever performs a function of sensing, previously described as the "early X." Two levers cooperate, in the sensing of impulses, to provide for the entries of pulses in the order X, 5, 3, 1 and 0, in a manner to be now described. All four sets of levers have some joint cooperative entry action for the early "X" entry. In column 1, for instance, levers 303A and 303B cooperate, levers 303B and 303C cooperate, and levers 303C and 303D cooperate, in their entry of values.

For example, referring to column 1, deck A, it can be seen, that in the position shown, lever 303B is over the "X" index position, and, because there is a hole there, there is an electrical circuit completed from frame 302 to contact strip 305. As the reciprocating frame 310 moves towards the left, lever 303B will move towards deck B where it will make contact with the deck B "5" index position pin, at the same time that lever 303A makes contact with the deck A, "5" index position pin. In moving to the left, the upper arm, of lever 303B, can no longer make contact with contact strip 305, even if actuated counterclockwise, but lever 303A now moves into position where it can meet contact strip 305. As the reciprocating frame continues to move to the left, lever 303A will sequentially contact the "5," "3," "1" and "0" index position pins, in that order, and complete a circuit from frame 302 to contact strip 305, if there is a hole in the card. At the same time, lever 303B which sensed the "X" position for deck A, now reads the rest of deck B.

There has thus been shown a sensing device which operates for multiple columns in a manner similar to the operation of the sensing mechanism which was described previously, in regard to Fig. 1, to complete an electrical circuit at predetermined times when there is a hole in the card. Likewise, the cam contacts CB1, CB2 and CB3 in Fig. 5B cooperate with the sensing mechanism to control the bucking triggers 66 to 70, in a manner similar to that described for the cam contacts CB1, CB2, and CB3, in Fig. 1, which cooperates with its sensing mechanism to control bucking trigger 25. A comparison of the timing charts of Figs. 3 and 6, which correspond respectively to the circuits of Figs. 1 and 5, indicate that the timing for the lever and pins, and cam contacts CB1, CB2 and CB3 are the same in both cases. To better understand how the sensing circuit operates, an example will be described in which it is desired to transmit a five digit number punched in deck C, columns 1 to 5, to the five order Storage Unit, previously described, and to be known as FS-1. To accomplish this, plus wires 315 to 319 must be connected, from the sensing hubs C-1 to C-5 inclusive, respectively, to the FS-1 entry hubs 321 to 325, inclusive.

Considering column 1 first, the lever 303D is shown, over the "X" index position pin, which is in its raised position because there is no "X" hole there and, therefore, lever 303D does not rock to close an electrical circuit. However, if any of the other columns 2 to 5, in deck C (sensing pins for columns 1 and 5 only, are illustrated) have a hole in the "X" index position, a circuit (not shown) will be completed for activating controls such as sign controls, etc.

Now, when reciprocating frame 310 moves towards the left, lever 303C makes contact with the "5" index position pin of deck C, which is in its depressed position (Fig. 5B) because there is a "5" hole in the card 301 in column 1 of deck C. The upper arm of lever 303C will contact the contact strip 307. Then, at the beginning of "5" index time, when cam contact CB1 closes (Fig. 6), a circuit is completed from the +40 volt supply via a lead 330, cam contact CB1, a point 331, a lead 332, to frame 302, the "5" index position pin, of deck C, now in the "5" hole, lever 303C, contact strip 307, sensing hub C–1, plugwire 315, FS–1 entry hub 321, to the right hand input of bucking trigger 66, turning it On. The right hand output of bucking trigger 66 is then positive, conditioning read-in switch 53, to thus allow the five pulses, at its input terminal "9" to pass through, to storage position 61. If there is a "5" hole in any of the other columns 2 to 5, of deck C, five pulses will be transmitted, in a similar manner, to the respective storage positions 62 to 65.

As the reciprocating frame 310 carries the lever 303C past the "5" index position toward the "3" index position, lever 303C slips off the "5" index pin. During the time that lever 303C is moving towards the "3" index position pins, cam contact CB3 closes (see Fig. 6) completing a circuit (Fig. 5B) from the +40 volt supply via a lead 335, cam contact CB3, a point 336 to a lead 337 which is connected via leads 341 to 345 inclusive, respectively, to the terminals "4" of the bucking triggers 66 to 70 inclusive. When cam contact CB3 closes, it, therefore, resets Off, all the bucking triggers 66 to 70, in the manner as previously described. This is similar to the resetting of the bucking trigger 25 of Fig. 1 by cam contact CB3, between "5" and "3" index times, previously described in respect to Fig. 1.

The cam contact CB2 of Fig. 1 was previously described as being used to control the bucking trigger 25 during "0" index time, taking into consideration that a "0" hole in the card might have the value of either a one or a zero. Cam contact CB2 functions in Fig. 1 by closing during "0" index time for producing the turning Off of bucking trigger 25 according to the idiosyncrasies of the code. Cam contact CB2 of Fig. 5B may also control bucking triggers 66 to 70 in a manner similar to that described for cam contact CB2 and bucking trigger 25 of Fig. 1. The closing of cam contact CB2 may tend to reset bucking triggers 66 to 70 by the circuit completed from the +40 volt supply, via lead 330, closed cam contact CB1, point 331, a lead 348, closed contact CB2, point 336, lead 337, to leads 341 to 345 inclusive, respectively, to the input terminals "4" of bucking triggers 66 to 70, inclusive.

The timing for the cam contacts CB1, CB2, CB3 and CB7 of Fig. 5B, as seen in Fig. 6, are identical with the timing of those same cam contacts in Fig. 1, as seen in Fig. 3. It can thus be understood that for the rest of the index times, the read-in circuit of Fig. 5B functions, in a similar manner to that described in regard to Fig. 1. Therefore, the digit in column 1, deck C, will enter the storage position 61, in a manner described in regard to Fig. 1 and the same is true for the digits in columns 2 to 5 which will enter the storage positions 62 to 65.

There has, therefore, been described novel means for reading data from a perforated record card into an electronic storage unit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A read-in circuit for use with a record controlled machine comprising, a pulse generator for delivering a plurality of timed bursts of pulses, each burst containing a predetermined number of discrete pulses, said pulse generator including means for initiating each burst at a predetermined machine time, means for sequentially sensing said record at each machine time, a bucking trigger, cam means for controlling said bucking trigger in conjunction with said sensing means at each of said machine times, and gating means controlled by said bucking trigger to effect transmission of a number of pulses corresponding to the value recorded in said record.

2. A read-in circuit for use with a record controlled accounting machine comprising a pulse generator adapted to deliver a plurality of bursts of pulses, each burst consisting of a predetermined number of discrete pulses, and each burst being initiated at a predetermined machine time, said pulse generator including an electronic ring, a plurality of electronic gating triggers controlled by said electronic ring, gating means, means including cam means for rendering said gating triggers operable, in a predetermined sequence, for controlling said gating means, a source of discrete pulses, conjointly controlled by said last mentioned means and said gating means for conversion to bursts of pulses; record sensing means, and other gating means controlled by said record sensing means for transmitting said delivered pulses.

3. A circuit for reading a value from a record, said value being represented by perforations at various index positions on said record according to a chosen code, comprising, a pulse generator for delivering bursts of high frequency pulses, at index times, representative of each index position, each burst consisting of a predetermined number of pulses according to said code, said pulse generator comprising an electronic ring, a plurality of electronic gating triggers, each producing differentiating gating pulses under control of said electronic ring, first electronic gating means, a source of high frequency pulses applied to said first gating means, means including cam means for selectively rendering said differentiating gating pulses operative individually, in a predetermined sequence, upon said first gating means, for transmitting said high frequency pulses in bursts, the number of said high frequency pulses depending upon the particular gating pulse applied to said first gating means; means for sequentially sensing each of said index position perforations, and a second gating means, controlled by said record sensing means, for transmitting said high frequency pulses from said first gating means.

4. A circuit for reading a value from a record said value being represented by perforations at various index positions on said record according to a chosen code, comprising a pulse generator for delivering bursts of high frequency pulses, at index times representative of each index position, each burst consisting of a predetermined number of pulses according to said code, said pulse generator comprising an electronic ring, a plurality of electronic gating triggers, each of which produces gating pulses of different duration under control of said electronic ring, first electronic gating means, a source of high frequency pulses applied to said first gating means, means, including cam means, for selectively rendering said different duration gating pulses operative individually, in a predetermined sequence, upon said first gating means, for transmitting said high frequency pulses in bursts, the number of said high frequency pulses depending upon the duration of the pulses applied to said gating means; a bucking trigger having an operative and inoperative state, gating means for transmitting said delivered pulses when said bucking trigger is operative, means acting to render said bucking trigger operative in response to perforations in said circuit, means selectively acting to render said bucking trigger inoperative, said bucking trigger remaining in its then state upon simultaneous operation of said two last mentioned means said operations occurring, according to requirements of said code.

5. In a read-in circuit for use with an indication bearing record controlled calculating machine, a pulse generator adapted to deliver a plurality of bursts of pulses, each burst consisting of a predetermined number of discrete pulses, and each burst being initiated at a predetermined machine time, said pulse generator including a chain of electronically bistable triggers, said triggers individually operable to an On or an Off condition and only one of said triggers being set to an On condition at any one time, a first source of pulses, means for connecting said first source of pulses to said chain, at each machine time, means, under control of said first source of pulses, for stepping the On condition with each pulse, from a preceding to a succeeding trigger, a plurality of gating triggers, each of which is connected to individual triggers of said chain and being sequentially turned On by said chain of triggers, means connected to the last trigger in said chain for simultaneously turning Off said plurality of gating triggers, each of said gating triggers, in being turned On and Off, developing an output gating pulse, of different time durations, first gating means, a second source of pulses applied to said first gating means, and means, including cam means, for applying the gating pulses of different time duration to said first gating means, for controlling the number of pulses delivered by said first gating means according to a predetermined code.

6. In a read-in circuit as set forth in claim 5, including means for sequentially sensing indications in a record at each machine time, storage means, and other gating means operatively connecting said first gating means and said sensing means to said storage means, said other gating means operative to selectively transmit the delivered pulses to said storage means.

7. In a read-in circuit as set forth in claim 6 and means operatively connected to said sensing means for selectively modifying, according to the chosen code, the selective transmittal by said other gating means of the bursts of pulses, said modifying means including a bucking trigger operatively connected to said other gating means, and additional cam means operatively connected to said bucking trigger.

8. A circuit for reading a value from a record, said value being represented by perforations at various index positions on said record according to a chosen code, comprising means for sequentially sensing each of said index positions for said perforations, a bucking trigger operatively connected to said sensing means, cam means for selectively controlling said bucking trigger, in conjunction with said sensing means, according to the chosen code, means for generating a burst of pulses at each of said index positions, each burst consisting of a predetermined number of pulses according to the chosen code, and gating means operatively connected to said generating means and said bucking trigger for selectively transmitting said delivered bursts of pulses.

9. A read-in circuit for use with a record controlled machine comprising, a pulse generator for delivering a plurality of timed bursts of pulses, each burst containing a predetermined number of discrete pulses, said pulse generator including means for initiating each burst at a predetermined machine time; means for sequentially sensing said record at each machine time, gating means operatively connected to said pulse generator and said sensing means to effect transmission of a number of delivered pulses corresponding to the value recorded in said record, means operatively connected to said record sensing means for selectively modifying, according to a chosen code, the selective transmittal by the gating means of the bursts of pulses, said modifying means including a bucking trigger operatively connected to the gating means and other cam means operatively connected to said bucking trigger.

References Cited in the file of this patent

UNITED STATES PATENTS

| | | |
|---|---|---|
| 2,282,028 | Bryce | May 5, 1942 |
| 2,425,307 | Desch et al. | Aug. 12, 1947 |
| 2,468,462 | Rea | Apr. 26, 1949 |
| 2,514,036 | Dickinson | July 4, 1950 |
| 2,523,516 | Potter | Sept. 26, 1950 |
| 2,648,835 | Rench | Aug. 11, 1953 |
| 2,624,507 | Phelps | Jan. 7, 1953 |
| 2,750,113 | Coleman | June 12, 1956 |
| 2,831,179 | Wright | Apr. 15, 1958 |